(12) United States Patent
Gonyou et al.

(10) Patent No.: US 12,529,341 B2
(45) Date of Patent: Jan. 20, 2026

(54) IGNITION SYSTEM AND METHOD OF OPERATING A COMBUSTION ENGINE

(71) Applicant: General Electric Company, Schenectady, NY (US)

(72) Inventors: Craig Alan Gonyou, Blanchester, OH (US); Sibtosh Pal, Mason, OH (US); Miles Burnett, Cincinnati, OH (US); Steven C. Vise, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/739,630

(22) Filed: Jun. 11, 2024

(65) Prior Publication Data
US 2025/0376948 A1 Dec. 11, 2025

(51) Int. Cl.
F02C 7/266 (2006.01)

(52) U.S. Cl.
CPC .......... *F02C 7/266* (2013.01); *F05D 2260/85* (2013.01)

(58) Field of Classification Search
CPC ................................. F02C 7/264; F02C 7/266
See application file for complete search history.

(56) References Cited

U.S. PATENT DOCUMENTS

| | | | |
|---|---|---|---|
| 4,918,389 A | 4/1990 | Schleupen et al. | |
| 5,334,938 A | 8/1994 | Kugler et al. | |
| 5,351,477 A | 10/1994 | Joshi et al. | |
| 5,408,825 A | 4/1995 | Foss et al. | |
| 5,590,529 A | 1/1997 | Joshi et al. | |
| 6,317,680 B1 | 11/2001 | Luttrell et al. | |
| 6,357,427 B1 | 3/2002 | Luttrelll et al. | |
| 7,343,745 B2 | 3/2008 | Inoue et al. | |
| 7,669,421 B2 | 3/2010 | Saitoh et al. | |
| 2005/0172637 A1 | 8/2005 | Ponziani et al. | |
| 2006/0037326 A1* | 2/2006 | Mehrer | F02P 15/003 60/776 |
| 2013/0308245 A1* | 11/2013 | Saxena | F23Q 3/006 361/257 |

(Continued)

FOREIGN PATENT DOCUMENTS

| | | | | |
|---|---|---|---|---|
| CN | 110762851 A | * | 2/2020 | ........... F24H 9/2035 |
| CN | 118188373 A | * | 6/2024 | |

(Continued)

OTHER PUBLICATIONS

Extended European Search Report for Application No. 25174110.4 dated Oct. 15, 2025, 6 pages.

*Primary Examiner* — Craig Kim
(74) *Attorney, Agent, or Firm* — Carter, DeLuca & Farrell LLP

(57) ABSTRACT

An ignition system for a combustion engine, includes a combustor having an igniter configured to receive a series of electrical current pulses, and, responsive to each electrical pulse, to generate a spark. A sensor is configured to detect each electrical pulse to provide a signal indicative of the electrical pulse to a controller. The controller is configured to determine, prior to an injection of a fuel into the combustor, a spark rate of the igniter, determine whether the spark rate satisfies a spark rate threshold, and in response to a determination that the spark rate satisfies the spark rate threshold, initiate an injection of the fuel into the combustor.

18 Claims, 8 Drawing Sheets

(56) References Cited

U.S. PATENT DOCUMENTS

| | | | |
|---|---|---|---|
| 2015/0036781 A1* | 2/2015 | Youssef | G07C 3/08 |
| | | | 377/15 |
| 2015/0260107 A1* | 9/2015 | Wright | F02P 3/0884 |
| | | | 315/210 |
| 2015/0323187 A1* | 11/2015 | Gomez del Campo | ............ |
| | | | F02C 7/266 |
| | | | 60/737 |
| 2017/0299183 A1 | 10/2017 | Bagchi et al. | |
| 2019/0120199 A1 | 4/2019 | Ambroise et al. | |
| 2019/0186437 A1* | 6/2019 | Lowery | F02C 7/222 |
| 2019/0186438 A1* | 6/2019 | Lowery | H05H 1/2441 |
| 2020/0018239 A1 | 1/2020 | Ramamurthi et al. | |
| 2021/0172376 A1* | 6/2021 | Fuller | F23R 3/00 |
| 2023/0220802 A1 | 7/2023 | Bucaro et al. | |
| 2023/0304665 A1* | 9/2023 | Patra | F23D 14/64 |
| 2023/0340934 A1* | 10/2023 | McBrien | F02P 17/12 |
| 2024/0191681 A1* | 6/2024 | McBrien | F02P 17/12 |
| 2025/0116404 A1* | 4/2025 | Lao | F23R 3/005 |

FOREIGN PATENT DOCUMENTS

| | | | | |
|---|---|---|---|---|
| CN | 118729275 A | * | 10/2024 | F23D 14/02 |
| CN | 114610657 B | * | 3/2025 | G06F 12/123 |
| WO | 2023/214129 A1 | | 11/2023 | |

* cited by examiner

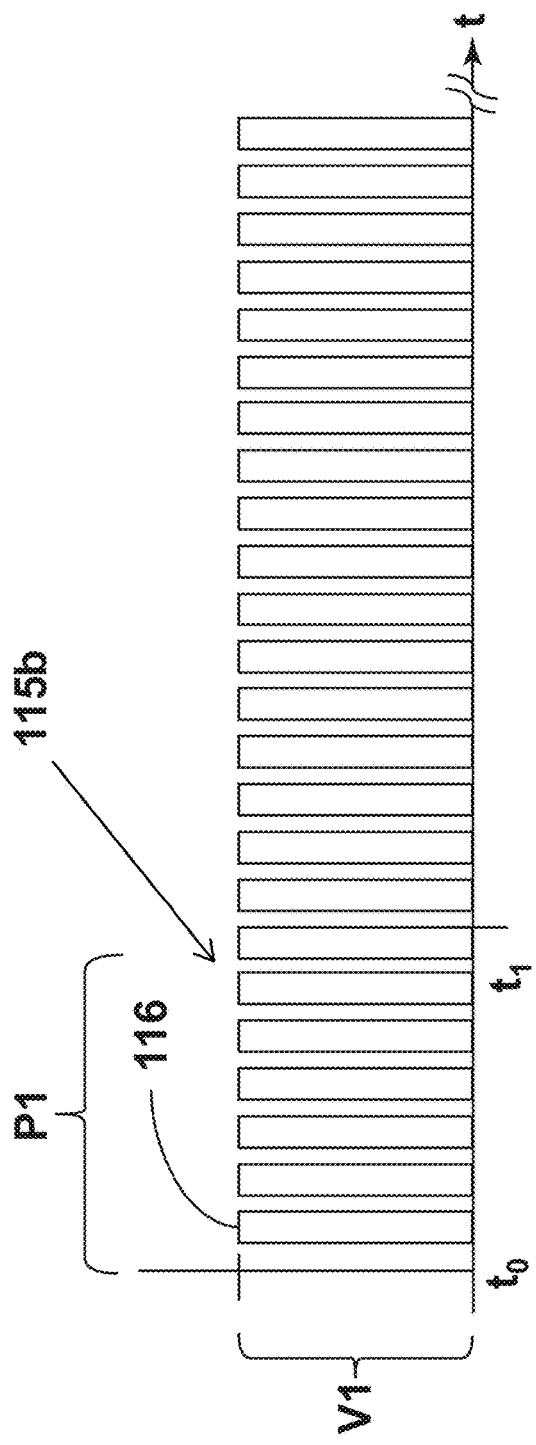
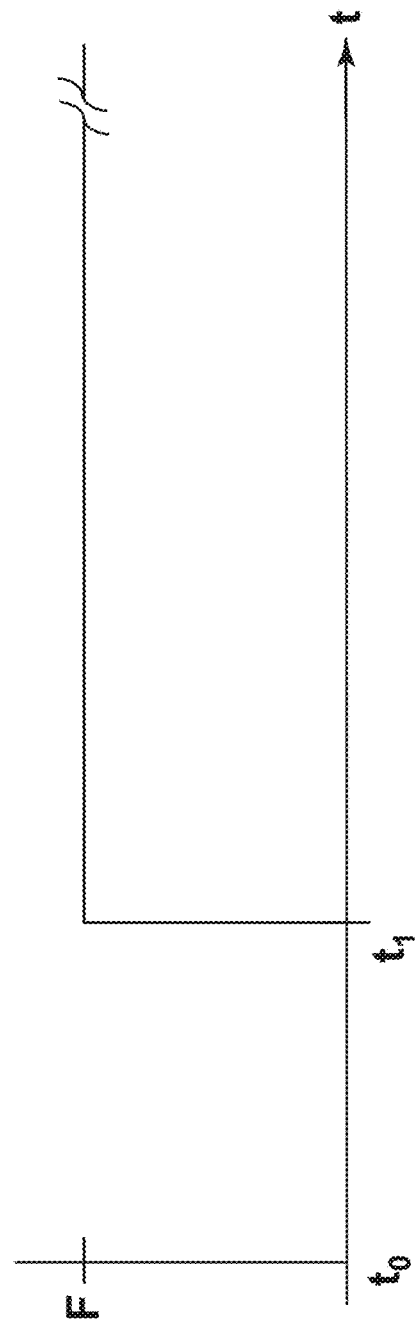
FIG. 5A
FIG. 5B

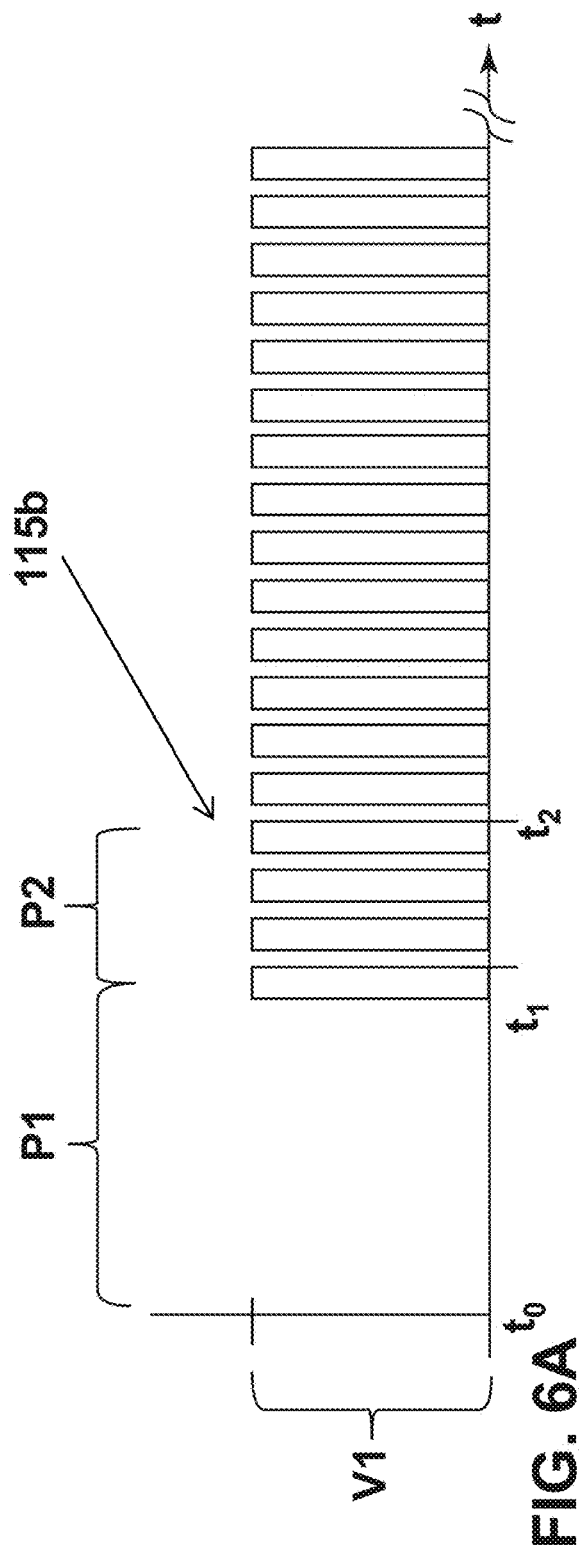
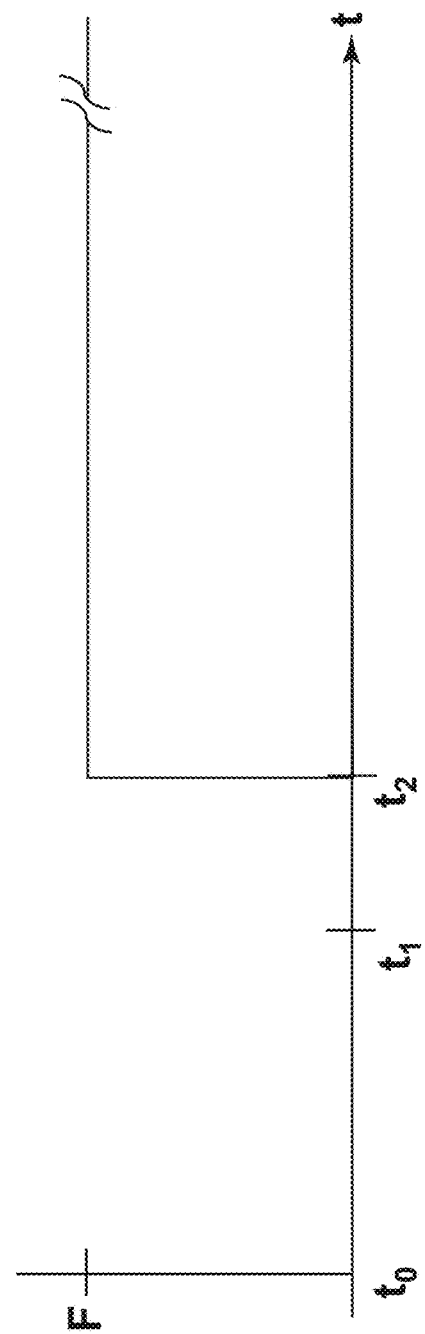
FIG. 6A
FIG. 6B

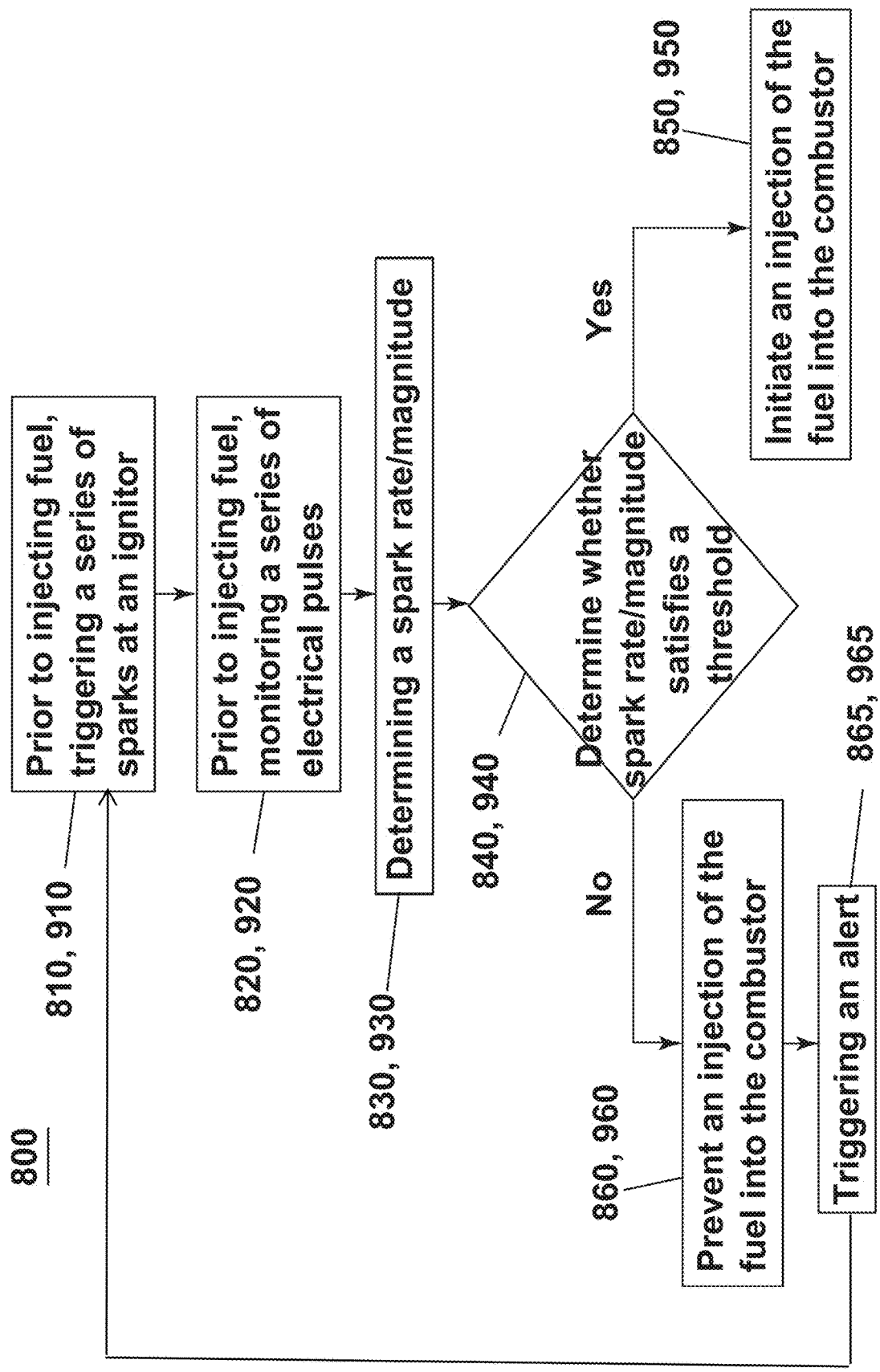

IGNITION SYSTEM AND METHOD OF OPERATING A COMBUSTION ENGINE

TECHNICAL FIELD

The disclosure generally relates to a method of operating a combustion engine, and more specifically to an ignition system for the combustion engine.

BACKGROUND

A gas turbine engine is a combustion engine that includes a turbine driven by combustion of a combustible fuel within a combustor of the turbine engine. The turbine engine utilizes a fuel injector assembly to inject the combustible fuel into the combustor. The fuel injector assembly can mix the fuel with air prior to injection in order to achieve efficient combustion. Igniters are then used to introduce an ignition spark into the combustor to ignite the fuel to initiate combustion.

BRIEF DESCRIPTION OF THE DRAWINGS

A full and enabling disclosure, including the best mode thereof, directed to one of ordinary skill in the art, is set forth in the specification, which makes reference to the appended figures in which:

FIG. 5A is a timing diagram, of an exemplary instance of a spark signal in accordance with an aspect as described herein.

FIG. 5B is a timing diagram depicting an instance of a state of fuel flow into a combustor in accordance with an aspect as described herein.

FIG. 6A is a timing diagram, of another exemplary instance of a spark signal in accordance with an aspect as described herein.

FIG. 6B is a timing diagram depicting another instance of a state of fuel flow into a combustor in accordance with an aspect as described herein.

FIG. 8 is a process flow diagram depicting a method of operating a combustion engine in accordance with an aspect as described herein.

DETAILED DESCRIPTION

Figure 1:
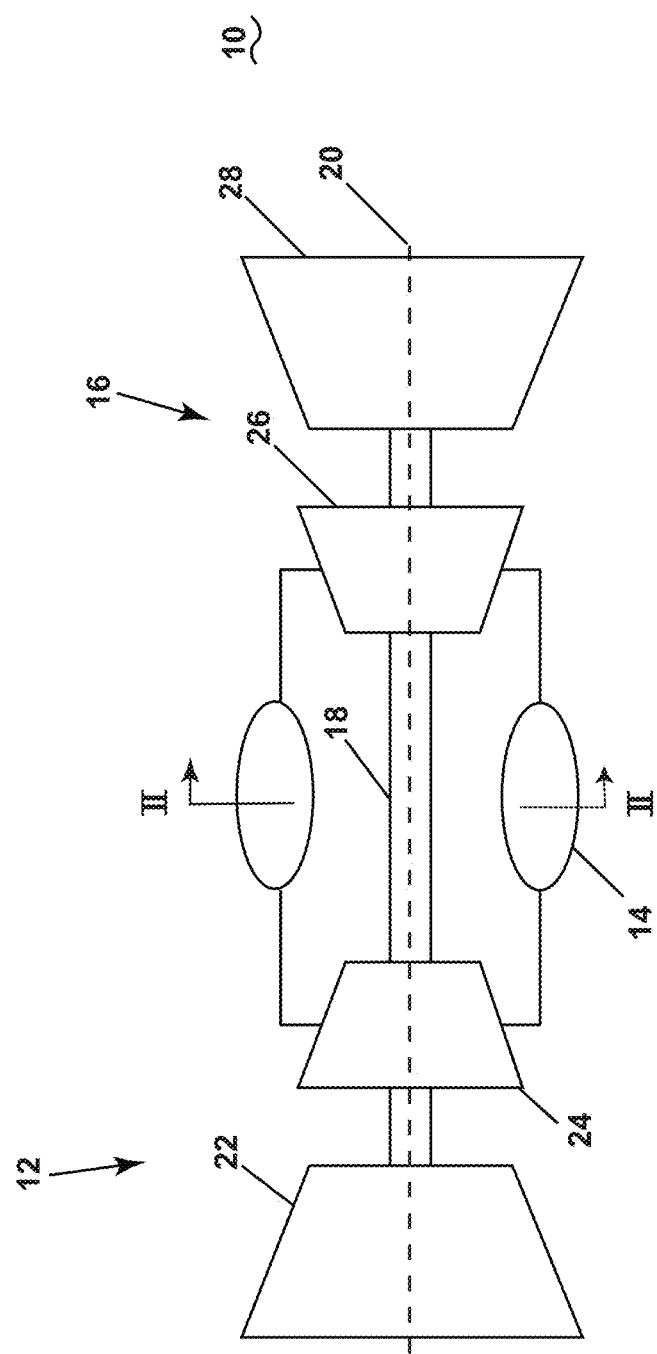
FIG. 1 is a schematic cross-sectional diagram of a turbine engine for an aircraft, the turbine engine including a combustion section.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all aspects described herein should be considered exemplary.

As used herein, the terms "first", "second", and "third" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The singular forms "a", "an", and "the" include plural references unless the context clearly dictates otherwise. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another.

The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, elements being "electrically connected," "electrically coupled," or "in signal communication" can include an electric transmission or signal being sent, received, or communicated to or from such connected or coupled elements. Furthermore, in various aspects, such electrical connections or couplings can include a wired or wireless connection, or a combination thereof.

Additionally, while terms such as "voltage", "current", and "power" are used herein, it will be evident to one skilled in the art that these terms can be interrelated when describing aspects of the electrical circuit, or circuit operations.

As used herein, the terms "controller", for example, "control module" describes a component configured or adapted to provide instruction, control, operation, or any form of communication for operable components to affect the operation thereof. Such controllers or modules can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. While described herein as comprising separate elements, in non-limiting aspects such controllers and modules can be incorporated on one or more devices including a common device, such as a single processor or microcontroller. Non-limiting examples of such controllers or module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module, regulator module, or integrator module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include program code to compare a first value with a second value, and operate or control operations of additional components based on the satisfying of that comparison. For example, when a sensed, measured, or provided value is compared with another value, including a stored or predetermined value, the satisfaction of that comparison can result in actions, functions, or operations controllable by the controller. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Also, as used herein, while sensors are described as "sensing", "detecting", "monitoring", or "measuring" a respective value, the sensing, detecting, monitoring, or measuring can include determining a value indicative of or related to the respective value, rather than directly sensing or measuring the value itself. The sensed, detected, measured, or monitored values can further be provided to additional components. For instance, the value can be provided to a control module or processor, and the control module or processor can perform processing, monitoring, or other operations on the value to determine a representative value or an electrical characteristic representative of said value.

Aspects of the disclosure described herein are described, by way of non-limiting example, in terms of a combustion engine including a combustor having an igniter to provide an ignition source such as a spark that can ignite a fuel within the combustor. While aspects are described, by way of non-limiting example, in the context of a fuel rich combustor, other aspects are not so limited, and aspects as disclosed herein can readily be embodied in both fuel rich and fuel lean combustion systems. Furthermore, aspects can be embodied in any desired combustor type, including, but not limited to trapped vortex combustors (TVC), rotating detonation combustors (RDC), and radial inflow (RI) combustors. For purposes of illustration, the present disclosure will be further described with respect to a turbine engine. It will be understood, however, that aspects of the disclosure described herein are not so limited and can be implemented in any desired combustion engine, including but not limited to, turbojet, turboprop, turboshaft, and turbofan engines. Aspects of the disclosure discussed herein likewise have applicability within non-aircraft engines having a combustor, such as other mobile applications and non-mobile industrial, commercial, and residential applications. Aspects can comprise or be implemented in an engine with any number of cylinders such as, for example, a two, four, six, or eight cylinder engine. In addition, aspects can be implemented in a naturally or supercharged aspirated, air cooled, horizontally opposed, reciprocating direct drive engine.

For example, aspects of the disclosure described herein can be implemented in a combustion section for a gas turbine engine. The combustion section can include a combustion chamber, a fuel injector fluidly coupled to a flow of a fuel, and at least one igniter fluidly coupled to the flow of fuel in the combustor. The fuel can be injected into the combustor by the fuel injector and can be mixed with air (e.g., from a swirler) to define a fuel air mixture in the combustion chamber. The igniter can be disposed within the combustion chamber, downstream of the injector. The fuel can include any suitable fuel.

Combustible hydrocarbon liquid fuel, such as Jet-A fuel, has long been used in gas turbine engines and the components of gas turbine engines, particularly, the combustor, have been designed for such fuels. Alternatively, a hydrogen fuel may be utilized to eliminate carbon dioxide emissions from commercial aircraft. Hydrogen fuel, however, poses a number of challenges as compared to combustible hydrocarbon liquid fuel, such as Jet-A fuel. Hydrogen fuel, for example, is a highly reactive fuel that burns at higher temperatures than hydrocarbon liquid fuel at the same stoichiometric fuel-air ratio. Hydrogen fuel also has much higher flame speeds. For example, the laminar flame speed for a hydrogen fuel of diatomic hydrogen is an order of magnitude greater than the laminar flame speed for Jet-A fuel.

Hydrogen fuels typically have a wider flammable range and a faster burning velocity than traditional fuels, such as petroleum-based fuels or petroleum and synthetic fuel blends. Consequently, for hydrogen fuel usage in a gas turbine engine having a combustor arranged upstream of the turbine, the fuel needs to be ignited essentially upon immediate entry into the combustor to avoid fuel accumulation within the combustion chamber and/or downstream of the combustion chamber. This need is based on the higher reactivity of hydrogen compared to conventional gas turbine fuels (e.g., Jet-A, NG). For example, the upper and lower explosive limit for hydrogen in air typically ranges from 18-59%, while natural gas typically has an explosive limit range of 5.7-14%. Due to these wider explosive limits, an unintended release of hydrogen within a given volume (e.g., exhausting out of the combustor and into the turbine) can lead to uncontrolled combustion of the fuel through the engine upon ignition. It is desirable that an operation of the igniter be reliably controlled to ensure that ignition (e.g. spark generation) occur at predetermined intervals or a predetermined frequency to ensure proper operation. Injection of a gaseous fuel (e.g., hydrogen) into the combustor without a properly timed spark or ignition source can result in a number of undesirable conditions. For example, the absence of a spark, or a spark occurring later in time than desired, can result in an accumulation of excess fuel within the combustion chamber. If the excess fuel is subsequently lit or ignited by the igniter, a strong pressure pulse within the combustor can result, and the consequent sudden release of energy prior to stabilization of the flame can cause hardware damage to the combustor.

Additionally, in the event that the fuel concentrations within the combustion chamber are not sufficient for a direct initiation of a detonation wave, a spark occurring earlier in time than desired can result in a circumferential deflagration-to-detonation transition wave through a primary combustion zone of the combustor. However, a localized concentration in the primary combustion zone can result in a deflagration flame that transitions to a detonation wave within the combustion chamber, with a consequent pressure pulse in the combustor. Such a pressure pulse can result in damage the combustor hardware. Furthermore, in the event certain fuels (e.g., hydrogen) do not combust in the combustor (for example due to the absence of a spark, or the occurrence of spark later in time than desired), unburnt fuel can flow downstream from the combustor, and a subsequent ignition of fuel within the combustor can lead to flame propagation downstream of the combustor. Depending on the concentration of the unburnt fuel downstream, potential flame propagation through the turbine and into the exhaust can occur, which can lead to hardware damage.

Aspects as described herein can reduce or prevent the occurrence of the aforementioned undesirable conditions. For example, aspects as described herein can determine, prior to an injection of a gaseous fuel into a combustor, a spark rate of the igniter, determine whether the spark rate satisfies a spark rate threshold, and in response to a determination that the spark rate satisfies the spark rate threshold, initiate the injection of the fuel into the combustor.

Reference will now be made in detail to the combustor architecture, and in particular the ignition system and method of operating a combustion engine, one or more examples of which are illustrated in the accompanying drawings. The detailed description uses numerical and letter designations to refer to features in the drawings. Like or similar designations in the drawings and description have been used to refer to like or similar parts of the disclosure.

FIG. 1 is a schematic view of a combustion engine such as a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines an engine centerline 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During an operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
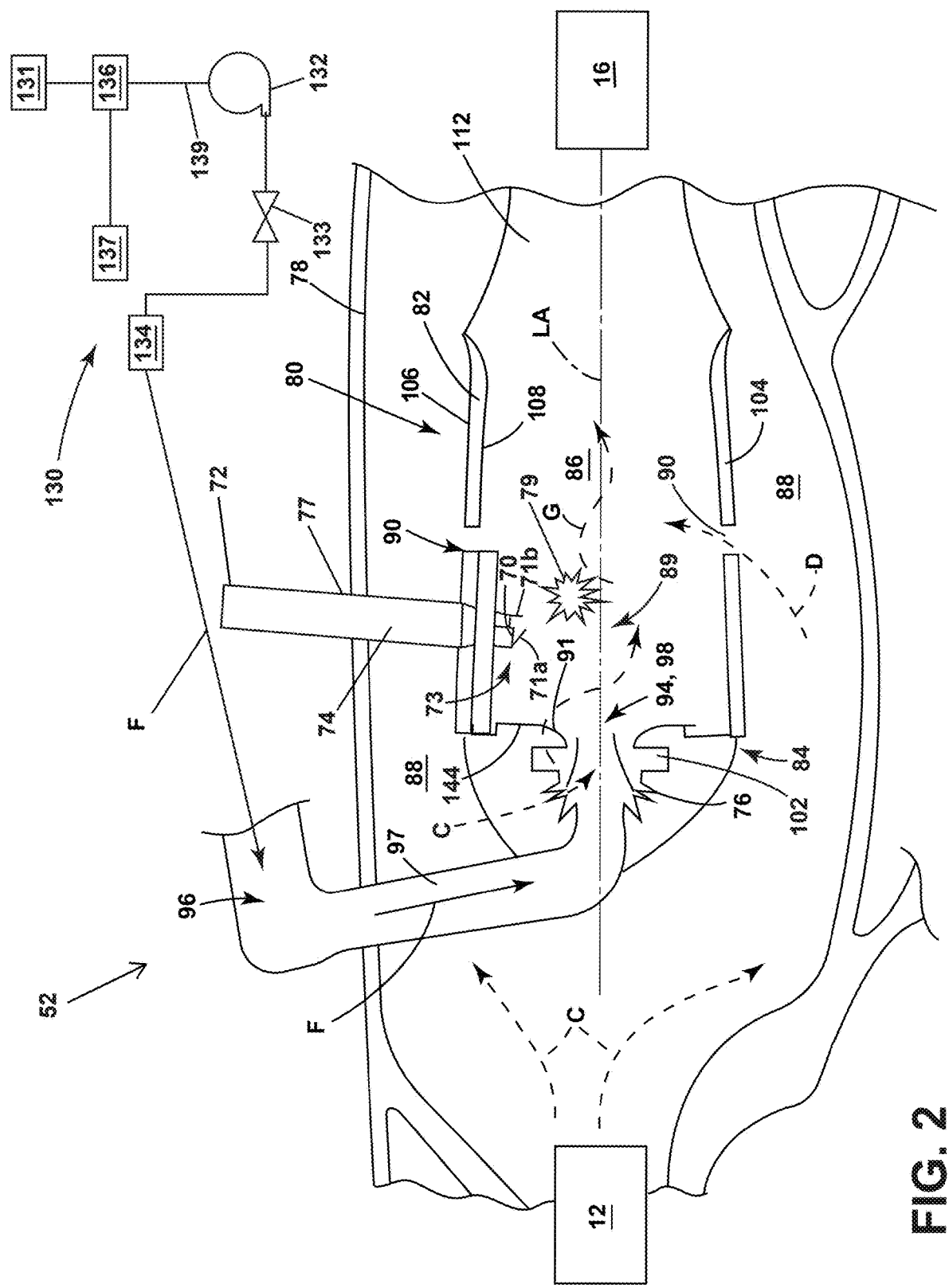
FIG. 2 is a schematic cross-sectional view of a portion of the combustion section of the turbine engine of FIG. 1, as seen from cut II-II of FIG. 1.

FIG. 2 depicts a schematic cross-sectional view of a generic combustion section 52 suitable for use as combustion section 14 of FIG. 1. The combustion section 52 can be fluidly coupled with a fuel system 130. The combustion section 52 can include an annular arrangement of fuel injectors 76 fluidly coupled to the fuel system 130, with each fuel injector 76 fluidly coupled with a combustor 80.

In non-limiting aspects, the fuel system 130 can include a fuel tank 131, a fuel delivery assembly 139, a vaporizer 136, a heat source 137, a fuel pump 132, a fuel valve 133, and a fuel manifold 134. The fuel system 130 can be configured to store fuel for the turbine engine 10 in the fuel tank 131 and to deliver the fuel to the turbine engine 10 via the fuel delivery assembly 139. The fuel delivery assembly 139 includes tubes, pipes, and the like, to fluidly couple various components of the fuel system 130 to the turbine engine 10 (FIG. 1). As discussed above, combustion section 52 discussed herein may be particularly suited for use with hydrogen fuel. In the aspect depicted in FIG. 2, the fuel (designated by arrow, "F") can be a hydrogen fuel comprising hydrogen, more specifically, diatomic hydrogen. In some aspects, the hydrogen fuel F may consist essentially of hydrogen.

The fuel tank 131 may be configured to hold the hydrogen fuel F at least partially in the liquid phase and may be configured to provide the hydrogen fuel F to the fuel delivery assembly 139 substantially completely in the liquid phase, such as completely in the liquid phase. For example, the fuel tank 131 may have a fixed volume and contain a volume of the hydrogen fuel F in the liquid phase (liquid hydrogen fuel). As the fuel tank 131 provides the hydrogen fuel F to the fuel delivery assembly 139 substantially completely in the liquid phase, the volume of the liquid hydrogen fuel F in the fuel tank 131 decreases and the remaining volume in the fuel tank 131 is made up by, for example, hydrogen in the gaseous phase (gaseous hydrogen). As used herein, the term "substantially completely" as used to describe a phase of the hydrogen fuel F, refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel F being in the stated phase.

To store the hydrogen fuel F substantially completely in the liquid phase, the hydrogen fuel F is stored in the fuel tank 131 at very low (cryogenic) temperatures. For example, the hydrogen fuel F may be stored in the fuel tank 131 at about-253 degrees Celsius or less at atmospheric pressure, or at other temperatures and pressures to maintain the hydrogen fuel F substantially in the liquid phase. The fuel tank 131 may be made from known materials such as titanium, Inconel®, aluminum, or composite materials. The fuel tank 131 and the fuel system 130 may include a variety of supporting structures and components to facilitate storing the hydrogen fuel F in such a manner.

The fuel delivery assembly 139 may include one or more lines, conduits, etc., configured to carry the hydrogen fuel between the fuel tank 131 and the combustion section 52. The fuel delivery assembly 139 thus provides a flow path of the hydrogen fuel from the fuel tank 131 to the fuel injectors 76. The hydrogen fuel F is delivered to the combustor 80 by the fuel delivery assembly 139 in the gaseous phase, the supercritical phase, or both (e.g., the gaseous phase and the supercritical phase). The vaporizer 136 can be in fluid communication with the fuel delivery assembly 139 to heat the liquid hydrogen fuel F flowing through the fuel delivery assembly 139. The vaporizer 136 is positioned in the flow path of the hydrogen fuel between the fuel tank 131 and the fuel injectors 76. The vaporizer 136 may be positioned in any suitable locations in the flow path of the hydrogen between the fuel tank 131 and the fuel injectors 76. Although only one vaporizer 136 is shown in FIG. 2, the fuel system 130 may include multiple vaporizers 136. For example, one vaporizer 136 can function as a primary vaporizer configured to operate once the turbine engine 10 is in a thermally stable condition, and another vaporizer 136 can be positioned upstream of the primary vaporizer and proximate to the fuel tank 131, and function as a primer vaporizer during a start-up (or prior to start-up) of the turbine engine 10 (FIG. 1). Other aspects are not so limited, and it is contemplated that in some aspects, the vaporizer 136 can be omitted, for example when the fuel is a conventional liquid fuel.

The vaporizer 136 can be in thermal communication with at least one heat source 137. The heat source 137 can be any suitable heat source. The heat source 137 may include, for example, an electrical heater, a catalytic heater or burner, and/or a bleed air flow from an auxiliary power unit. In some aspects, the heat source 137 can be integral to the vaporizer 136, such as when the vaporizer 136 includes one or more electrical resistance heaters, or the like, that are powered by an electrical power source. In such a configuration, the heat source 137 can provide heat for the vaporizer 136 independent of whether or not the turbine engine 10 (FIG. 1) is running and can be used, for example, during start-up, or prior to start-up, of the turbine engine 10.

As noted, the vaporizer 136 is in communication with a flow of the hydrogen fuel F through the fuel delivery assembly 139. The vaporizer 136 is configured to draw heat the heat source 137 to heat the flow of hydrogen fuel F from a substantially completely liquid phase to a substantially completely gaseous phase or to a substantially completely supercritical phase.

The liquid hydrogen fuel F is supplied from the fuel tank 131 to the fuel delivery assembly 139. The fuel pump 132 is in fluid communication with the fuel delivery assembly 139 to induce the flow of the hydrogen fuel F through the fuel delivery assembly 139 to the fuel injectors 76. The fuel pump 132 may generally be a primary source of a pressure rise in the fuel delivery assembly 139 between the fuel tank 131 and the fuel injectors 76. The fuel pump 132 may be configured to increase a pressure in the fuel delivery assembly 139 to a pressure greater than a pressure within a combustion chamber 86 of the combustor 80, and to overcome any pressure drop of components placed downstream of the fuel pump 132.

The fuel pump 132 is positioned within the flow of hydrogen fuel F in the fuel delivery assembly 139 at a location downstream of the vaporizer 136. The fuel pump 132 may be any suitable pump configured to receive the flow of hydrogen fuel F in substantially completely a gaseous phase or a supercritical phase. In other aspects, however, the fuel pump 132 may be positioned at any suitable location, including other positions within the flow path of the hydrogen fuel F. For example, the fuel pump 132 may be located upstream of the vaporizer 136 and may be configured to receive the flow of hydrogen fuel F through the fuel delivery assembly 139 in a substantially completely liquid phase.

The fuel valve 133 (e.g., a fuel metering valve) is in fluid communication with the fuel delivery assembly 139. Any suitable fuel valve 133 may be used including, for example, a fuel metering valve coupled in fluid communication with the fuel delivery assembly 139. The fuel delivery assembly 139 is configured to provide the flow of hydrogen fuel F to the fuel valve 133. The fuel valve 133 can be positioned downstream of the fuel pump 132. The fuel valve 133 is further configured to provide the flow of the hydrogen fuel F to the fuel injectors 76 in a desired manner. The fuel valve 133 is configured to provide a desired volume of the hydrogen fuel F at, for example, a desired flow rate, to the fuel manifold 134. The fuel manifold 134 then distributes (provides) the hydrogen fuel F received to the fuel injectors 76 within the combustion section 52 where the hydrogen fuel F is mixed with compressed air, and the mixture of hydrogen fuel F and compressed air is combusted to generate combustion gases that drive the turbine engine 10 (FIG. 1). Adjusting the fuel valve 133 can change the volume of fuel F provided to the fuel injectors 76.

It should be appreciated that the fuel system depicted in FIG. 2 is an exemplary fuel system, depicted for illustrative purposes only and is not intended to be limiting. It should also be appreciated that the annular arrangement of fuel injectors 76 can be only one or can be multiple fuel injectors 76, and one or more of the fuel injectors 76 can have different characteristics. The fuel injector 76 shown is for illustrative purposes only and is not intended to be limiting.

The combustor 80 can have a can, can-annular, or annular arrangement depending on the type of turbine engine in which the combustor 80 is located. In the non-limiting example of FIG. 2, an annular arrangement is illustrated and disposed within a casing 78. The combustor 80 can include an annular combustor liner 82, a dome assembly 84 including a dome wall 144 which together define the combustion chamber 86 about a longitudinal axis (LA). A compressed air passage 88 can be defined at least in part by both the annular combustor liner 82 and the casing 78. At least one fuel injector 76 is fluidly coupled to the combustion chamber 86. A passage can fluidly connect the compressed air passage 88 and the combustor 80. The passage can be defined by at least one set of dilution openings 90 located in the annular combustor liner 82.

At least one igniter 77 can extend into the combustion chamber 86. For example, each igniter 77 can extend through the casing 78, and through the annular combustor liner 82 and into the combustion chamber 86. Each igniter 77 can include a base 72, a tip 73, and a body 74 extending therebetween. The body 74 extends through combustor liner 82 such that the tip 73 is proximate a combustion zone 89 at least partially surrounded by the combustor liner 82. Each igniter 77 is configured to receive ignition energy (e.g., a voltage pulse) through the base 72 and generate an ignition source or spark 79 at the tip 73. For example, in some non-limiting aspects, the igniter 77 can include a first electrode 71a, a second electrode 71b, and an electrical insulator 70. The first electrode 71a, second electrode 71b, and electrical insulator 70 can be arranged such that the first electrode 71a and the second electrode 71b cooperate to carry an electrical charge and to produce the spark 79 for the combustor 80 between a tip of first electrode 71a and a tip of second electrode 71b. The first electrode 71a, the second electrode 71b, and the electrical insulator 70 can also be arranged such that first electrode 71a and the second electrode 71b cooperate to carry an electrical current related to an electrostatic field (not shown) proximate the first electrode 71a and the second electrode 71b. It should be appreciated that the igniter 77 depicted in FIG. 2 is an exemplary igniter, depicted for illustrative purposes only and is not intended to be limiting.

The fuel injector 76 can be coupled to and disposed within the dome assembly 84 upstream of a flare cone 91 to define a fuel outlet 94. The fuel injector 76 can include a fuel inlet 96 that can be adapted to receive the flow of hydrogen fuel F and a linear fuel passageway 97 extending between the fuel inlet 96 and the fuel outlet 94. A swirler 102 can be provided at a dome inlet 98 to swirl incoming air in proximity to the fuel F exiting the fuel injector 76 and provide a swirled mixture of air and fuel F entering the combustor 80. As used herein, the term "swirl" or iterations thereof can refer to a directional movement of a fluid in at least two directions (e.g., radial, circumferential, and/or axial). A "swirl" can be formed as a twisting or spiraling pattern.

The annular combustor liner 82 can be defined by a wall 104 having an outer surface 106 and an inner surface 108 at least partially defining the combustion chamber 86. The wall 104 can be made of one continuous monolithic portion or be multiple monolithic portions assembled together to define the annular combustor liner 82. By way of non-limiting example, the outer surface 106 can define a first piece of the wall 104 while the inner surface 108 can define a second piece of the wall 104 that when assembled together form the annular combustor liner 82. As described herein, the wall 104 includes the at least one set of dilution openings 90. It is further contemplated that the annular combustor liner 82 can be any type of annular combustor liner 82, including but not limited to a double walled liner or a tile liner.

During operation, compressed air (designated "C") can flow from the compressor section 12 to the combustor 80 through the compressed air passage 88. The at least one set of dilution openings 90 in the annular combustor liner 82 allow passage of at least a portion of the compressed air C, the portion defining a dilution airflow (designated "D"), from the compressed air passage 88 to the combustion chamber 86.

Some compressed air C can be mixed with the fuel F from the fuel injector 76 which can be ignited within the combustion chamber 86 by the at least one igniter 77 to generate combustion gas (designated "G"). The mixture of compressed air C and fuel F can reside in the combustion chamber 86 for a specific time period, commonly referred to as a residence time. The residence time can be a function of a number of factors including combustor geometry, pressure, fuel type, and temperature prior to entering the combustion chamber 86. The combustion gas G is mixed using the dilution airflow D supplied through the at least one set of dilution openings 90, and mixes within the combustion chamber 86, after which the combustion gas G flows through a combustor outlet 112 and exits into the turbine section 16. As noted hereinabove, while the illustrated arrangement depicts a fuel rich combustor, other aspects are not so limited, and can include fuel lean combustors.

Figure 3:
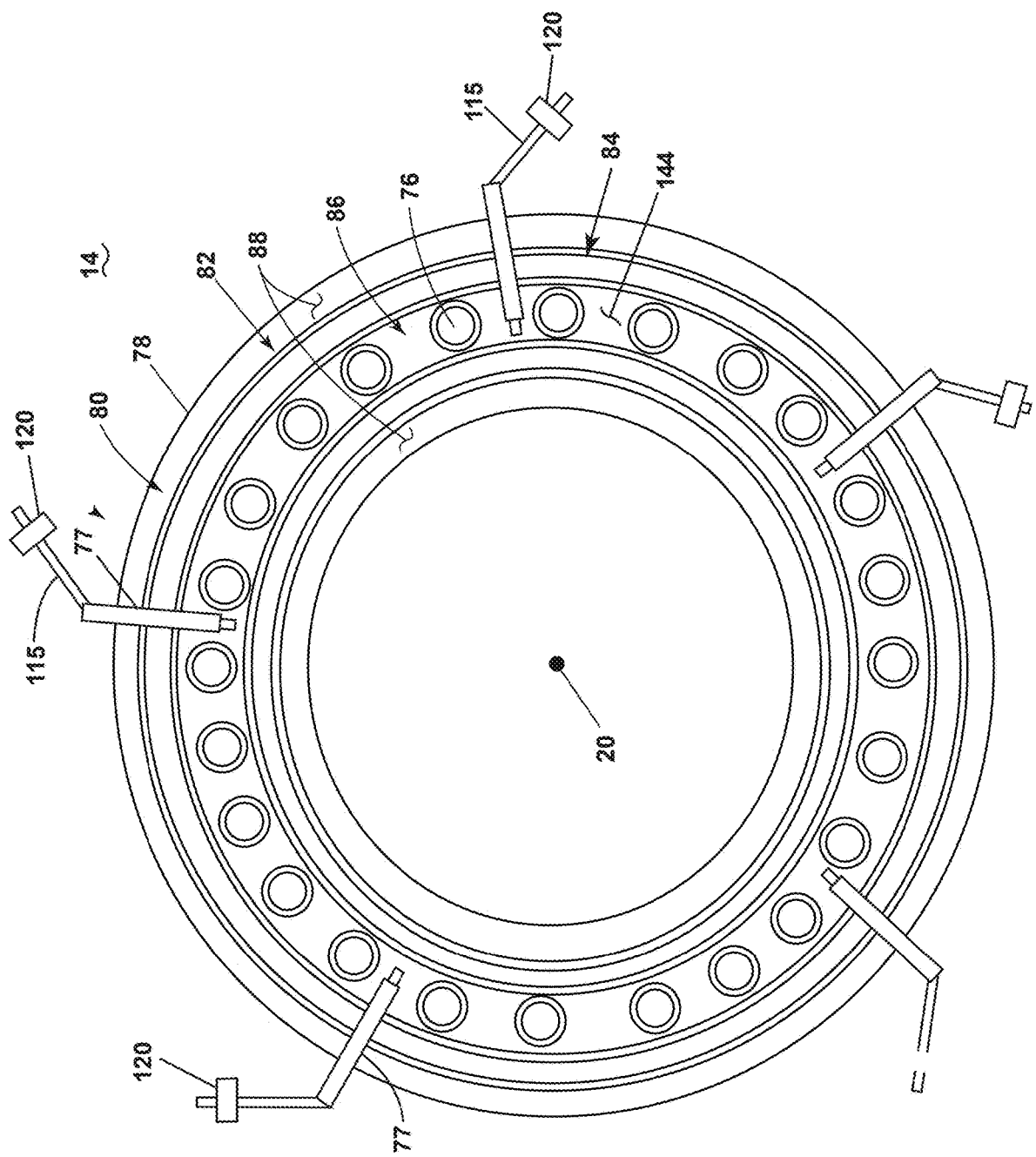
FIG. 3 is a schematic cross-sectional side view of a generic combustion section suitable for use as the combustion section of FIG. 1.

FIG. 3 depicts a cross-section view of the combustion section 14 of FIG. 1 along line II-II. The combustion section 14 is shown as including the fuel injectors 76 of FIG. 2 annularly disposed around the engine centerline 20 of the turbine engine 10 of FIG. 1. The combustor 80 can be defined by the combustor liner 82. The dome assembly 84 including the dome wall 144 together with the combustor liner 82 can define the combustion chamber 86 annularly about the engine centerline 20. At least one fuel injector 76, illustrated as multiple primary fuel injectors 76 annularly arranged about the engine centerline 20, is fluidly coupled to the combustion chamber 86. The compressed air passage 88 can be defined at least in part by both the combustor liner 82 and the casing 78.

In non-limiting aspects, the at least one igniter 77 can include an annular arrangement of igniters 77, each extending into the combustion chamber 86. For example, some aspects can include a set of igniters 77, circumferentially spaced from each other. It should be appreciated that the annular arrangement of igniters 77, can be a single igniter 77, (as shown in FIG. 2), or can be multiple igniters 77 (as shown in FIG. 3) and one or more of the igniters 77 can have different characteristics and that the one igniter 77, is depicted for illustrative purposes only and is not intended to be limiting.

Each of the igniters can be electrically coupled to a transmission line 115. At least one transmission line 115 can be communicatively coupled to a respective sensor 120. In some aspects, each of the transmission lines 115 can be communicatively coupled to a respective sensor 120. In other aspects, as illustrated in FIG. 3, only a subset of the transmission lines 115 can be communicatively coupled to a respective sensor 120.

Figure 4:
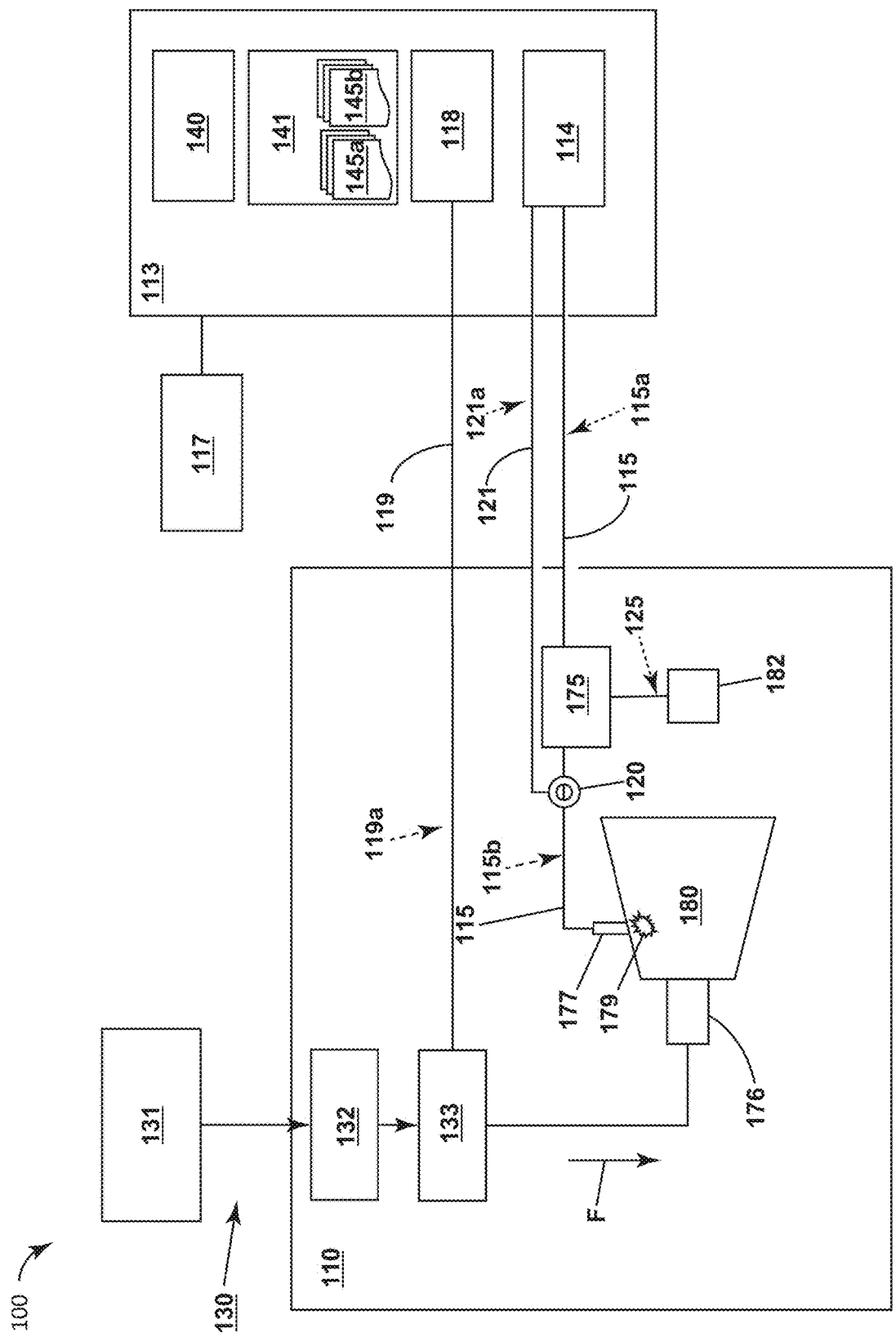
FIG. 4 is a schematic block diagram of an ignition system in accordance with an aspect as described herein.

FIG. 4 is a schematic block diagram illustrating an exemplary combustion engine 110 and an ignition system 100 therefor, in accordance with an exemplary aspect, with some parts omitted for clarity. The ignition system 100 is depicted and discussed for ease of understanding as implemented in an aircraft, but other aspects are not so limited, and it is contemplated that other aspects can be implemented in any combustion engine without departing from the disclosure herein.

The ignition system 100 can include a controller 113 communicatively coupled to the combustion engine 110 to control an operation thereof. The combustion engine 110 can include the fuel system 130 arranged to provide a flow of fuel F to a combustor 180. The combustion engine 110 can further include an igniter 177 and the sensor 120. The igniter 177 can be communicatively coupled to an exciter 175 via the transmission line 115 and configured to initiate a spark 179. The sensor 120 can be communicatively coupled to the transmission line 115. The exciter 175 can be electrically coupled to a power source 182. The fuel system 130 can include the fuel tank 131, the fuel pump 132, and the fuel valve 133 fluidly coupled to a fuel injector 176. A user interface 117 such as a display or monitor can be communicatively coupled to the controller 113.

The controller 113 can include a computing device such as a processor 140, and a memory 141. The controller 113 can be communicatively coupled to the igniter 177, the fuel pump 132, the fuel injector 176, and any other desired part of the combustion engine 110 to control respective operations thereof. For example, the controller 113 can include a spark control module 114, and a fuel control module 118. The memory 141 can store, among other things, a set of predetermined threshold values, such as a set of spark rate thresholds 145$a$ and a set of pulse magnitude thresholds 145$b$.

The controller 113 can be a system of controllers or a single controller. The controller 113 can be a controller dedicated to the control of an operation of the combustion engine 110 and associated components. The controller 113 can be, for example, an Electronic Engine Controller (EEC) or an Electronic Control Unit (ECU) of a Full Authority Digital Engine Control (FADEC) system.

The processor 140 can be configured to perform a variety of computer-implemented functions and/or instructions (e.g., performing the methods, steps, calculations and the like and storing relevant data as disclosed herein). The instructions, when executed by the processor 140, can cause the processor 140 to perform operations, as described herein.

The spark control module 114 can be communicatively coupled to the igniter 177 via the transmission line 115. In non-limiting aspects, the exciter 175 (e.g., an ignition coil) can be communicatively coupled to the spark control module 114 to receive a first spark signal 115$a$ therefrom, and further communicatively coupled to the igniter 177 and to provide a second spark signal 115$b$ thereto. In non-limiting aspects, the exciter 175 can be further coupled to a power source 182 to receive an input voltage 125 (e.g., 24 volts DC), and can supply the second spark signal 115$b$ as an output voltage pulse (e.g., 2000 volts DC) in response to the first spark signal 115$a$. The power source 182 can be for example, without limitation, a battery, a capacitor, an inductor, an airframe electrical bus, an engine-mounted generator, and the like. In non-limiting aspects, the exciter 175 can be for example, a pulsed inductive or capacitive discharge device such as a conventional ignition coil or spark gap device. The exciter 175 can be configured to discharge energy from the power source 182, or other power storage device (not shown) for example, at a predetermined voltage level or magnitude. In other non-limiting aspects, the exciter 175 can be an electronic exciter comprising a solid-state switching device (not shown) configured to regulate an energy discharge from the power source 182, or other power storage device (not shown), and to provide the second spark signal 115b to the igniter 177 based on the first spark signal 115a. The first spark signal 115a or the second spark signal 115b, or both, can comprise a series of electrical pulses 116 such as a single voltage pulse or a series of voltage pulses, each electrical pulse 116 (FIG. 5A) corresponding to or indicative of a respective spark 179 initiated by the igniter 177. The series of electrical pulses 116 can be triggered by the spark control module 114 to define a predetermined spark rate (e.g., between 10 and 200 sparks per second) for example depending on an operating condition of the combustion engine 110. For instance, in non-limiting aspects, the exciter 175 can be responsive to the first spark signal 115a from the spark control module 114 to provide the second spark signal 115b to the igniter 177 at a first spark rate during an engine starting cycle, then to transition to or reset to a second spark rate during normal engine operation.

The sensor 120 (e.g., an inductive voltage or current sensor) can be arranged to monitor the transmission line 115 for an electrical pulse or signal thereon (e.g., the first spark signal 115a, or the second spark signal 115b, or both). The sensor 120 is communicatively coupled to the controller 113 via a communication line 121. The sensor 120 is configured to provide a sensor signal 121a via the communication line 121 indicative of the sensed electrical pulse (e.g., the first spark signal 115a or the second spark signal 115b, or both) on the transmission line 115 indicative of a respective spark 179 initiated by the igniter 177. The sensor 120 can include one or more sensors for sensing, measuring, detecting, and/or monitoring a voltage or a current or both, during operation. The communication line 121 can be a suitable wired or wireless communication line.

The fuel control module 118 can be communicatively coupled to the fuel valve 133 via a fuel supply control line 119. The fuel control module 118 can provide signals to control the delivery of fuel F by the fuel valve 133 to the fuel injector 176. For example, the fuel control module 118 can be configured to control an operation of the fuel valve 133 by providing a fuel valve signal 119a via the fuel supply control line 119. While the fuel valve 133 is depicted for ease of description and understanding as a separate element from the fuel injector 176, it is contemplated that in some aspects the fuel valve 133 can be integrated into the fuel injector 176. As such, in non-limiting aspects, the fuel valve signal 119a can alternatively be provided to the fuel injector 176 without departing from the scope of the disclosure. In some non-limiting aspects, the fuel valve 133 can be an electrical fuel valve, such as a solenoid valve. The fuel valve 133 can include, for example, one or more electromagnetically operated valves having coils (not shown) that can be energized and de-energized responsive to the fuel valve signal 119a to open and close the valves. The fuel valve 133 can be in fluid communication with the fuel pump 132. The fuel pump 132 can be an electrical type fuel pump, such as a diaphragm pump. In other non-limiting aspects, the fuel pump 132 can be a mechanical type fuel pump, for example driven by the drive shaft 18 (FIG. 1), via gearing (not shown).

In operation, the controller 113 can receive various engine signal inputs indicative of various predetermined engine operating parameters, and is configured to provide or output various control signals in accordance with predetermined settings. For example, in non-limiting aspects, prior to an injection of the fuel F into the combustor 180, (e.g., prior to a start-up of the engine) the spark control module 114 can be configured to provide the first spark signal 115a to initiate a charging and discharging of the exciter 175 to control ignition timing (e.g., the spark rate) or an energy level of the spark 179 generated by the igniter 177. The exciter 175 can provide the second spark signal 115b in the form of a series of electrical pulses 116 (FIG. 5A) to the igniter 177. It is contemplated that each electrical pulse 116 (FIG. 5A) of the second spark signal 115b can cause the igniter 177 to trigger or initiate a corresponding spark 179. The transmission line 115 can be monitored by the sensor 120, to detect the series of electrical pulses 116. The sensor 120 can provide the sensor signal 121a indicative of various characteristics of the series of electrical pulses 116, such as a pulse frequency (e.g., a pulse rate), a pulse magnitude, and the like, to the controller 113. Conversely, a lack of an electrical pulse 116 (e.g., a current pulse) to the igniter 177 would result no signal sensor signal 121a provided by the sensor 120, and thus indicative of a no spark condition or a pulse frequency of zero. The controller 113 can determine the pulse frequency and/or pulse magnitude based on the sensor signal 121a. Since each electrical pulse 116 of the second spark signal 115b causes the igniter 177 to trigger a spark 179, the controller 113 can determine the spark rate based on the determined pulse frequency. For example, there can be a one-to-one correspondence between the pulse frequency and the spark rate. The controller 113 can further determine whether the determined spark rate satisfies the predetermined spark rate threshold 145a. For example, the controller 113 can compare the determined spark rate to the predetermined spark rate threshold 145a stored in memory 141. In some aspects, the controller 113 can further determine the pulse magnitude based on the sensor signal 121a. The controller 113 can further determine whether the determined pulse magnitude satisfies the predetermined pulse magnitude threshold 145b. For example, the controller 113 can compare the determined pulse magnitude to the predetermined pulse magnitude threshold 145b stored in memory 141. In response to a determination that the spark rate of the igniter 177 satisfies the spark rate threshold 145a, and/or the pulse magnitude satisfies the pulse magnitude threshold 145b, the controller 113 can initiate an injection of the fuel F into the combustor 180, for example by triggering the fuel valve signal 119a via the fuel supply control line 119 to operate the fuel valve 133.

While the aspect depicted in FIG. 4 is shown and discussed for ease of description and understanding, as including a single igniter 177, with a single transmission line 115 being monitored by a single sensor 120, other aspects are not so limited. It is contemplated that other aspects can include any desired number of igniters 177, having any desired number of transmission lines 115, monitored by any desired number of sensors 120 without departing from the scope of the disclosure.

For example, in some aspects, the igniter 177 can include a set of igniters 177, with each igniter 177 coupled to a respective transmission line 115. In such aspects, each respective transmission line 115 can be communicatively coupled to a respective sensor 120, with each respective sensor 120 arranged to monitor the respective transmission line 115 for an electrical pulse or signal thereon (e.g., the first spark signal 115a, or the second spark signal 115b, or both). Each sensor 120 is communicatively coupled to the controller 113 via a respective communication line 121, and configured to provide a respective sensor signal 121a indicative of the sensed electrical pulse (e.g., the first spark signal 115a or the second spark signal 115b, or both) to the controller 113. The controller 113 can monitor each respective communication line 121 sequentially, or in parallel. It will be appreciated that a sampling rate of the controller 113 can be arranged based on a desired spark rate. The controller 113 can determine the pulse frequency and/or pulse magnitude for each respective igniter 177, based on the sensor signal 121a. The controller 113 can determine whether the determined pulse magnitude for each respective igniter 177 satisfies the predetermined pulse magnitude threshold 145b and/or determine whether the determined pulse magnitude for each respective igniter 177 satisfies the predetermined pulse magnitude threshold 145b. For example, the controller 113 can compare the determined spark rate of each respective igniter 177 to the predetermined spark rate threshold 145a stored in memory 141, and/or compare the determined pulse magnitude for each respective igniter 177 to the predetermined pulse magnitude threshold 145b stored in memory 141. In response to a determination that the spark rate of each igniter 177 satisfies the spark rate threshold 145a, and/or the pulse magnitude for each igniter 177 satisfies the predetermined pulse magnitude threshold 145b, the controller 113 can initiate an injection of the fuel F into the combustor 180, for example by triggering the fuel valve signal 119a via the fuel supply control line 119 to operate the fuel valve 133.

In some aspects, only a subset of the transmission lines 115 are coupled to the set of igniters 177 are communicatively coupled to a respective sensor 120. In such aspects, each respective sensor 120 is arranged to monitor the respective transmission line 115 of the subset of transmission lines 115 for an electrical pulse or signal thereon (e.g., the first spark signal 115a, or the second spark signal 115b, or both). Each sensor 120 is communicatively coupled to the controller 113 via a respective communication line 121, and configured to provide a respective sensor signal 121a indicative of the sensed electrical pulse 116 to the controller 113. The controller 113 can determine the pulse frequency and/or pulse magnitude on each respective transmission line 115 of the subset of transmission lines 115, based on the respective sensor signal 121a. The controller 113 can determine whether the determined pulse magnitude on each respective transmission line 115 of the subset of transmission lines 115 satisfies the predetermined pulse magnitude threshold 145b and/or determine whether the determined pulse magnitude on each respective transmission line 115 of the subset of transmission lines 115 satisfies the predetermined pulse magnitude threshold 145b. For example, the controller 113 can compare the determined spark rate on each respective transmission line 115 of the subset of transmission lines 115 to the predetermined spark rate threshold 145a stored in memory 141, and/or compare the determined pulse magnitude on each respective transmission line 115 of the subset of transmission lines 115 to the predetermined pulse magnitude threshold 145b stored in memory 141. In response to a determination that the spark rate on each respective transmission line 115 of the subset of transmission lines 115 satisfies the spark rate threshold 145a, and/or the pulse magnitude on each respective transmission line 115 of the subset of transmission lines 115 satisfies the predetermined pulse magnitude threshold 145b, the controller 113 can initiate an injection of the fuel F into the combustor 180, for example by triggering the fuel valve signal 119a via the fuel supply control line 119 to operate the fuel valve 133.

In some aspects, at least one igniter 177 of the set of igniters can be designated as an at least one master igniter 177. In such aspects, the controller 113 can be configured to consider the spark rate and/or the pulse magnitude of the at least one master igniter 177, without regard to or considering the spark rate and/or the pulse magnitude of any remaining (e.g., non-master) igniters 177. For example, the controller 113 can compare the determined spark rate on the respective transmission line 115 electrically coupled to the at least one master igniter 177 to the predetermined spark rate threshold 145a stored in memory 141, and/or compare the determined pulse magnitude on the respective transmission line 115 electrically coupled to the at least one master igniter 177 to the predetermined pulse magnitude threshold 145b stored in memory 141. In response to a determination that the spark rate on the respective transmission line 115 coupled to the at least one master igniter 177 satisfies the spark rate threshold 145a, and/or the pulse magnitude on each respective transmission line 115 of the subset of transmission lines 115 satisfies the predetermined pulse magnitude threshold 145b, the controller 113 can initiate an injection or flow of the fuel F into the combustor 180, for example by triggering the fuel valve signal 119a via the fuel supply control line 119 to operate the fuel valve 133.

FIG. 5A is a timing diagram for an exemplary instance of the second spark signal 115b over time, as triggered by the spark control module 114 (FIG. 4) in one non-limiting aspect. The second spark signal 115b is depicted as a series of electrical pulses 116 having a magnitude designated "V1" over time, designated as "t", for at least a predetermined first period designated as P1. The predetermined first period P1 can be a predetermined first period of time (e.g., having a predetermined duration).

FIG. 5B is a timing diagram depicting a state of the fuel flow F into the combustor 180 (FIG. 4) over time, for the instance of FIG. 5A. For example, FIG. 5B illustrates no flow of fuel F until time equal to $t_1$, after which the flow of fuel F is initiated.

More specifically, with simultaneous reference to FIGS. 4 and 5A-5B, prior to an injection of fuel F into the combustor 180 by the fuel injector 176 (e.g., at a start-up of the engine), the spark control module 114 can trigger the igniter 177 to generate or initiate the ignition source or spark 179. The spark control module 114 can trigger the series of electrical pulses 116 to the igniter 177 via the respective transmission line 115 to initiate a respective series of sparks 179. Each electrical pulse 116 can result in, or be correlated to, respective spark 179 generated by the igniter 177. For example, in non-limiting aspects, the spark control module 114 can provide the first spark signal 115a to the exciter 175 to trigger the second spark signal 115b to the igniter 177. The sensor 120 can monitor the transmission line 115 for the series of electrical pulses 116 during the predetermined first period P1. In non-limiting aspects, the predetermined first period P1 can be based on a calculated, determined, or desired residence time of the fuel F in the combustor 180. In other aspects the predetermined first period P1 can be based on any number of factors including, but not limited to the number of igniters 177 coupled to the combustor 180, the particular combustor geometry, fuel type, and the like.

The sensor 120 can provide the sensor signal 121a indicative of various characteristics of the series of electrical pulses 116 to the controller 113 via the communication line 121. For example, the sensor signal 121a can include an indication of the pulse rate or frequency of the series of electrical pulses 116. Additionally, or alternatively, the sensor signal 121a can include an indication of other characteristics of the series of electrical pulses 116, such as the pulse magnitude, the pulse duration, and the like, of any one or more of the electrical pulses 116.

In non-limiting aspects, the controller 113 can determine the pulse frequency during the predetermined first period P1 based on the sensor signal 121a. Since each pulse 116 corresponds to a respective spark 179 initiated by the igniter 177, the controller 113 can determine the spark rate based on the pulse frequency. The controller 113 can further determine whether the spark rate satisfies the spark rate threshold 145a. For example, in some instances, the controller 113 can compare the determined spark rate to the predetermined spark rate threshold 145a stored in the memory 141.

In response to a determination that the determined spark rate during the predetermined first period P1 satisfies the spark rate threshold 145a, the controller 113 can initiate an injection of the fuel F into the combustor 180, for example by triggering the fuel valve signal 119a to the fuel valve 133 via the fuel supply control line 119. For example, the fuel control module 118 can provide the fuel valve signal 119a to operate the fuel pump 132 to provide the flow of fuel F from the fuel tank 131 to the fuel injector 176.

In response to a determination that the determined spark rate does not satisfy the spark rate threshold 145a, the controller 113 can prevent an injection or flow of fuel F into the combustor 180, for example by blocking or terminating the fuel valve signal 119a the fuel valve 133. In some non-limiting aspects, in response to a determination that the determined spark rate does not satisfy the spark rate threshold 145a during the predetermined first period P1, the controller 113 can trigger an alert or display to the user interface 117, indicative of the determination that the determined spark rate does not satisfy the spark rate threshold 145a.

In non-limiting aspects, in response to the determination that the determined spark rate during the predetermined first period P1 does not satisfy the spark rate threshold 145a, the sensor 120 can continue to monitor the transmission line 115 for a predetermined second period P2 subsequent to the predetermined first period P1. The predetermined second period P2 can be a predetermined second period of time (e.g., having a predetermined duration).

FIG. 6A illustrates a timing diagram for another exemplary instance of the second spark signal 115b over time, as triggered by the spark control module 114 for one non-limiting instance. The second spark signal 115b is depicted as a series of electrical pulses 116 having a magnitude designated "V1" over time, designated as "t", and including the predetermined first period P1 and the predetermined second period P2. FIG. 6B depicts a state of the flow of fuel F into the combustor 180 (FIG. 4) over time for the instance of FIG. 6A.

With simultaneous reference to FIGS. 4 and 6A-6B, in the particular instance illustrated, the controller 113 has determined spark rate does not satisfy the spark rate threshold 145a during the predetermined first period P1. In such an instance, the controller 113 can determine the pulse frequency of the series of pulses 116 during the second period P2 for example, based on the sensor signal 121a, and can determine the spark rate during the second period P2 based on the pulse frequency. The controller 113 can further determine whether the spark rate during the predetermined second period P2 satisfies the spark rate threshold 145a, for example, by comparing the determined spark rate to the predetermined spark rate threshold 145a.

As illustrated in FIG. 6B, in response to a determination that the determined spark rate during the predetermined second period P2 satisfies the spark rate threshold 145a, the controller 113 can initiate an injection of the flow of fuel F into the combustor 180, by triggering the fuel valve signal 119a to the fuel valve 133 to provide the flow of fuel F from the fuel tank 131 to the fuel injector 176. For example, FIG. 6B illustrates no flow of fuel F until the second period P2 (e.g., at time equal to $t_2$), after which the flow of fuel F is initiated. In non-limiting aspects, a duration of predetermined second period P2, or the sum of the predetermined first period P1 and the predetermined second period P2, or both, can be determined based on the calculated or desired residence time of the fuel in the combustor 180.

In some non-limiting aspects, in response to a determination that the determined spark rate does not satisfy the spark rate threshold 145a, the controller 113 can trigger an alert or display to the user interface 117, indicative of the determination that the determined spark rate does not satisfy the spark rate threshold 145a.

In response to a determination that the determined spark rate during the predetermined second period P2, does not satisfy the spark rate threshold 145a, the controller 113 can prevent an injection or flow of the fuel F into the combustor 180, for example blocking or terminating the fuel valve signal 119a the fuel valve 133. In some non-limiting aspects, in response to a determination that the determined spark rate during the predetermined second period P2, does not satisfy the spark rate threshold 145a, the controller 113 can trigger an alert or display to the user interface 117, indicative of the determination that the determined spark rate does not satisfy the spark rate threshold 145a.

Figure 7A:
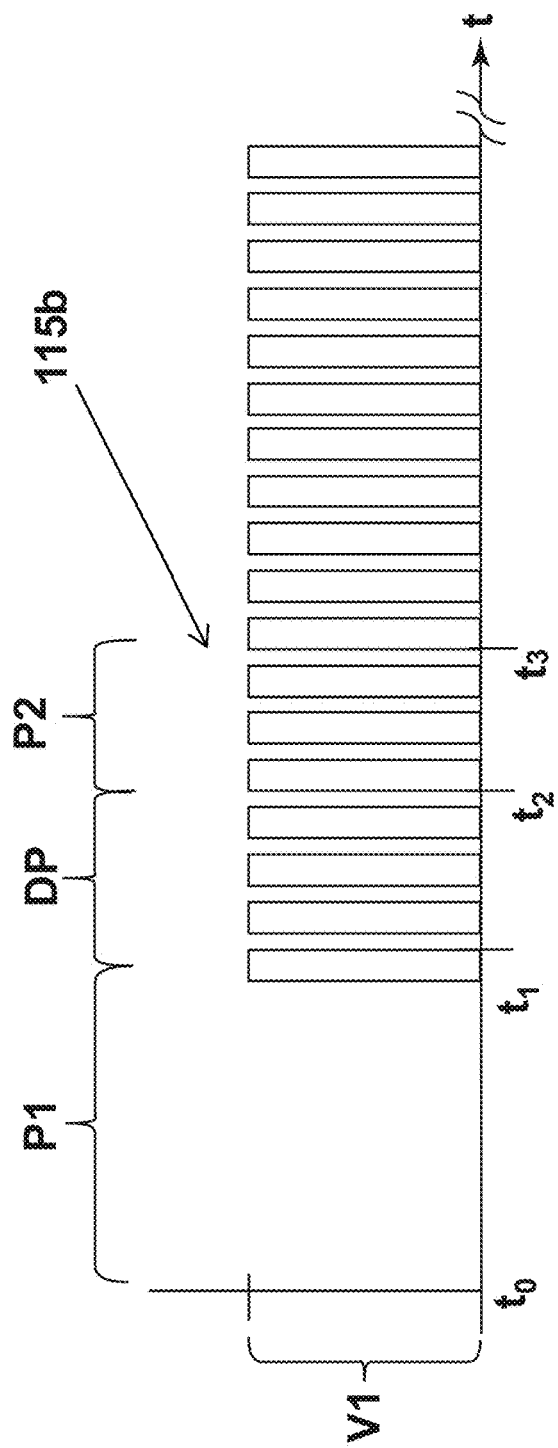
FIG. 7A is a timing diagram, of yet another exemplary instance of a spark signal in accordance with an aspect as described herein.
Figure 7B:
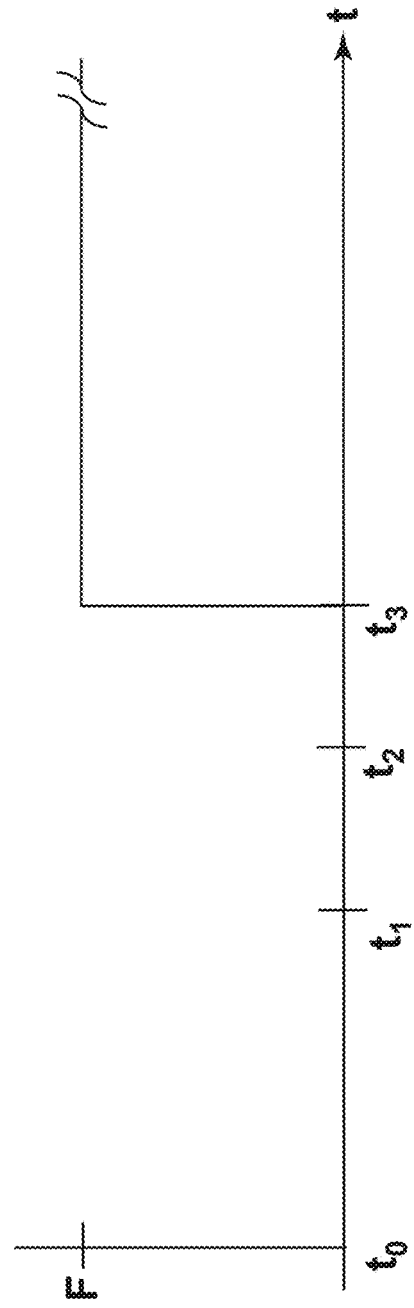
FIG. 7B is a timing diagram depicting yet another instance of a state of fuel flow into a combustor in accordance with an aspect as described herein.

In some non-limiting aspects, there can be a predetermined delay period between the predetermined first period P1 and the predetermined second period P2. The predetermined delay period DP can be subsequent to the predetermined first period P1. The predetermined second period P2 can be subsequent the predetermined delay period. DP FIG. 7A illustrates a timing diagram, for another exemplary instance of the second spark signal 115b over time, as triggered by the spark control module 114 for one non-limiting instance. The second spark signal 115b is depicted as a series of electrical pulses 116 having a magnitude designated "V1" over time, designated as "t", and including the predetermined first period P1 and the predetermined second period P2, and further including the predetermined delay period DP between the predetermined first period and the predetermined second period P2. FIG. 7B depicts a state of the flow of fuel F into the combustor 180 (FIG. 4) over time for the instance of FIG. 7A. For example, FIG. 7B illustrates no flow of fuel F until the predetermined second period P2 (e.g., at time equal to $t_3$), after which the flow of fuel F is initiated.

With simultaneous reference to FIGS. 4 and 7A-7B, in the particular instance illustrated, the controller 113 has determined spark rate does not satisfy the spark rate threshold 145a during the predetermined first period P1. In such an instance, the controller 113 can wait a predetermined delay period DP, and then can determine the pulse frequency of the series of pulses 116 during the predetermined second period P2, after the predetermined delay period DP, and the spark rate during the predetermined second period P2 based on the pulse frequency. The controller 113 can further determine whether the spark rate during the predetermined second period P2 satisfies the spark rate threshold 145a, for example, by comparing the determined spark rate to the predetermined spark rate threshold 145a.

As illustrated in FIG. 7B, in response to a determination that the determined spark rate satisfies the spark rate threshold 145a during the predetermined second period P2, the controller 113 can initiate an injection of the fuel F into the combustor 180, for example by triggering the fuel valve signal 119*a* via the fuel supply control line 119 to the fuel valve 133.

In response to a determination that the determined spark rate during the predetermined second period P2 does not satisfy the spark rate threshold 145*a*, the controller 113 can prevent an injection or flow of the fuel F into the combustor 180, for example blocking or terminating the fuel valve signal 119*a* the fuel valve 133.

In some non-limiting aspects, in response to a determination that the determined spark rate during the predetermined second period P2, does not satisfy the spark rate threshold 145*a*, the controller 113 can trigger an alert or display to the user interface 117, indicative of the determination that the determined spark rate does not satisfy the spark rate threshold 145*a*.

FIG. 8 depicts a method 800 of operating a combustion engine 110. The combustion engine 110 can include a combustor 180 including at least one igniter 177. Although described in terms of a gas turbine engine, it will be appreciated that the method 800 can be applied to any combustion engine without departing from the disclosure herein. While the method 800 will be described herein, for ease of understanding, in terms of the combustion engine 10, 110 of FIGS. 1-4, other aspects are not so limited and the method 800 can be implemented with any combustion engine without departing from the scope of the disclosure.

The method 800 begins, prior to an injection of fuel F to the combustor 180, at 810, triggering a series of sparks 179 at the at least one igniter 177. For example, the triggering the series of sparks 179 at the igniter 177 can include providing a series of electrical pulses 116 to the igniter 177 via a respective transmission line coupled to the at least one igniter 177. The method 800 can include, prior to the injection of fuel F (e.g., hydrogen) into the combustor 180, at 820, monitoring the series of electrical pulses 116 on a respective transmission line 115 coupled to the at least one igniter 177 during a predetermined first period P1. In some aspects, the monitoring the series of electrical pulses 116 can continue during the predetermined first period of time P1. The duration (e.g., time) of the predetermined first period P1 can be based on a calculated, determined, or desired residence time of the fuel F in the combustor 180. In other aspects the duration of the predetermined first period P1 can be based on any number of factors including, but not limited to the number of igniters 177 coupled to the combustor 180, the particular combustor geometry, fuel type, and the like. In non-limiting aspects, each electrical pulse 116 can be respectively indicative of a spark generated by the at least one igniter 177.

The method 800 can include at 830, determining, by the controller 113, a spark rate and/or a pulse magnitude of the at least one igniter 177 during the predetermined first period P1 based on the series of electrical pulses 116. For example, in some aspects, the determining the spark rate of the at least one igniter 177 during the predetermined first period P1 based on the series of electrical pulses 116 can further include determining, by the controller 113, a pulse magnitude of the series of electrical pulses 116.

The method 800 can include at 840, determining, by the controller 113, whether the spark rate of the at least one igniter 177 during the predetermined first period P1 satisfies the spark rate threshold 145*a* and/or whether the pulse magnitude of the at least one igniter 177 satisfies the predetermined pulse magnitude threshold 145*b*. For example, in some aspects, the determining by the controller 113 whether the spark rate of the at least one igniter 177 during the predetermined first period P1 satisfies the spark rate threshold 145*a*, can further include determining, by the controller 113, whether the pulse magnitude of the series of electrical pulses 116 satisfies the pulse magnitude threshold 145*b*.

In some aspects of the method 800, the at least one igniter 177 can include a set of igniters 177, and the monitoring the series of electrical pulses 116 on a respective transmission line 115 coupled to the at least one igniter 177 can include detecting the series of electrical pulses 116 on a respective transmission line 115 coupled to at least a subset of the set of igniters 177. In such aspects, the determining the spark rate of the at least one igniter 177 includes determining the spark rate of the at least a subset of the set of igniters 177. For example, the determining whether the spark rate of the at least one igniter 177 satisfies the spark rate threshold 145*a* can include determining whether the spark rate of the at least a subset of the set of igniters 177 satisfies the spark rate threshold 145*a*.

In other non-limiting aspects, at least one igniter 177 of the at least a subset of the set of igniters 177 can be designated as an at least one master igniter 177. In such aspects, the monitoring the series of electrical pulses 116 on the respective transmission line 115 coupled to the at least a subset of the set of igniters 177 includes detecting the series of electrical pulses 116 on the respective transmission line 115 coupled to the at least one master igniter 177. For example, the determining the spark rate of the at least the subset of the set of igniters 177 can include determining the spark rate of the at least one master igniter 177, without regard to the spark rate of any remaining igniters 177. In such aspects, the determining whether the spark rate of the at least the subset of the set of igniters 177 satisfies the spark rate threshold 145*a* can include determining whether the spark rate of the at least one master igniter 177 satisfies the spark rate threshold 145*a*.

In response to determining that the spark rate of the at least one igniter 177, or the subset of igniters 177, or the master igniter 177, during the predetermined first period P1, satisfies the spark rate threshold 145*a*, and/or the pulse magnitude of the at least one igniter 177 during the predetermined first period P1 satisfies the predetermined pulse magnitude threshold 145*b*, the method 800 can include at 850 initiating the injection of the fuel into the combustor 180.

In non-limiting aspects, the method 800 can include, in response to determining that the spark rate of the at least one igniter 177 during the predetermined first period P1 does not satisfy the spark rate threshold 145*a*, and/or the pulse magnitude of the at least one igniter 177 during the predetermined first period P1 does not satisfy the predetermined pulse magnitude threshold 145*b* the method 800 can include at 860 preventing the injection of the fuel F into the combustor 180. In non-limiting aspects, in response to determining that the spark rate of the at least one igniter 177 during the predetermined first period P1 does not satisfy the spark rate threshold 145*a*, and/or the pulse magnitude of the at least one igniter 177 during the predetermined first period P1 does not satisfy the predetermined pulse magnitude threshold 145*b* the method 800 can include, at 865, triggering an alert. For example, the controller 113 can send an alert to the user interface 117 such as a display or monitor.

In non-limiting aspects, the method 800 can include, in response to determining that the spark rate of the at least one igniter 177 during the predetermined first period P1 does not satisfy the spark rate threshold 145*a*, and/or the pulse magnitude of the at least one igniter 177 during the predetermined first period P1 does not satisfy the predetermined pulse magnitude threshold 145b the method 800 can further include at 910, triggering the series of sparks 179 at the at least one igniter 177. For example, the triggering the series of sparks 179 at the igniter 177 can include providing a series of electrical pulses 116 to the igniter 177 via a respective transmission line 115 coupled to the at least one igniter 177. The method 800 can include, prior to the injection of fuel F (e.g., hydrogen) into the combustor 180, at 920, monitoring the series of electrical pulses 116 on a respective transmission line 115 coupled to the at least one igniter 177 during the predetermined second period P2. The predetermined second period P2 can be a period of time based on a calculated, determined, or desired residence time of the fuel F in the combustor 180. In other aspects the predetermined second period P2 can be based on any number of factors including, but not limited to the number of igniters 177 coupled to the combustor 180, the particular combustor geometry, fuel type, and the like. The predetermined delay period DP occurs subsequent to the predetermined first period P1. In some aspects, the predetermined second period P2 can occur subsequent to a predetermined delay period DP.

In some aspects, the monitoring the series of electrical pulses 116 can continue during the predetermined second period P2. In non-limiting aspects, each electrical pulse 116 can be respectively indicative of a spark 179 generated by the at least one igniter 177.

The method 800 can include at 930, determining, by the controller 113, a spark rate and/or a pulse magnitude of the at least one igniter 177 during the predetermined second period P2 based on the series of electrical pulses 116.

The method 800 can include at 940, determining, by the controller 113, whether the spark rate of the at least one igniter 177 during the predetermined second period P2 satisfies the spark rate threshold 145a and/or whether the pulse magnitude of the at least one igniter 177 satisfies the predetermined pulse magnitude threshold 145b.

In response to determining that the spark rate of the at least one igniter 177 during the predetermined second period P2 satisfies the spark rate threshold 145a, and/or the pulse magnitude of the at least one igniter 177 during the predetermined second period P2 satisfies the predetermined pulse magnitude threshold 145b, the method 800 can include at 950 initiating the injection of the fuel into the combustor 180.

In non-limiting aspects, the method 800 can include, in response to determining that the spark rate of the at least one igniter 177 during the predetermined second period P2 does not satisfy the spark rate threshold 145a, and/or the pulse magnitude of the at least one igniter 177 during the predetermined first period P1 does not satisfy the predetermined pulse magnitude threshold 145b the method 800 can include at 960 preventing the injection of the fuel F into the combustor 180. In non-limiting aspects, in response to determining that the spark rate of the at least one igniter 177 during the predetermined second period P2 does not satisfy the spark rate threshold 145a, and/or the pulse magnitude of the at least one igniter 177 during the predetermined second period P2 does not satisfy the predetermined pulse magnitude threshold 145b the method 800 can include, at 965, triggering an alert.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A method of operating a combustion engine having a combustor including at least one igniter, the method comprising: prior to an injection of a gaseous fuel into the combustor, monitoring, for a predetermined first period, a series of electrical pulses on a respective transmission line coupled to the at least one igniter, each electrical pulse respectively indicative of a spark generated by the at least one igniter; determining, by a controller, based on the series of electrical pulses during the predetermined first period, at least one of a spark rate of the at least one igniter, or a pulse magnitude of the series of electrical pulses; determining, by the controller, whether the at least one of the spark rate of the at least one igniter during the predetermined first period satisfies a spark rate threshold, or the pulse magnitude of the series of electrical pulses during the predetermined first period satisfies a pulse magnitude threshold; and in response to a determination that the at least one of the spark rate of the at least one igniter during the predetermined first period satisfies the spark rate threshold, or the pulse magnitude of the of the series of electrical pulses during the predetermined first period satisfies the pulse magnitude threshold, initiating the injection of the gaseous fuel into the combustor.

The method of any preceding clause, further comprising, in response to a determination that the spark rate of the at least one igniter during the predetermined first period does not satisfy the spark rate threshold, or the pulse magnitude of the of the series of electrical pulses during the predetermined first period does not satisfy the pulse magnitude threshold, preventing the injection of the gaseous fuel into the combustor.

The method of any preceding clause, further comprising: prior to the injection of the gaseous fuel into the combustor, monitoring, for a predetermined second period, the series of electrical pulses on the respective transmission line coupled to the at least one igniter; determining, by the controller, based on the series of electrical pulses during the predetermined second period, at least one of the spark rate of the at least one igniter, or the pulse magnitude of the series of electrical pulses; determining, by the controller, whether the at least one of the spark rate of the at least one igniter during the predetermined second period satisfies a spark rate threshold, or the pulse magnitude of the series of electrical pulses during the predetermined second period satisfies a pulse magnitude threshold; and, in response to a determination that the at least one of the spark rate of the at least one igniter during the predetermined second period satisfies the spark rate threshold, or the pulse magnitude of the of the series of electrical pulses during the predetermined second period satisfies the pulse magnitude threshold, initiating the injection of the gaseous fuel into the combustor.

The method of any preceding clause, wherein the predetermined second period occurs subsequent to a predetermined delay period.

The method of any preceding clause, wherein the at least one igniter includes a set of igniters, wherein monitoring the series of electrical pulses on a respective transmission line coupled to the at least one igniter includes detecting the series of electrical pulses on a respective transmission line coupled to at least a subset of the set of igniters; wherein the determining the spark rate of the at least one igniter includes determining the spark rate of the at least a subset of the set of igniters; wherein the determining, by the controller, the pulse magnitude of the at least one igniter includes determining the pulse magnitude of the at least a subset of the set of igniters; wherein the determining, by the controller, whether the spark rate of the at least one igniter satisfies the spark rate threshold includes determining whether the spark rate of the at least a subset of the set of igniters satisfies the spark rate threshold; and wherein the determining, by the controller, whether the pulse magnitude of the at least one igniter satisfies the spark rate magnitude threshold includes determining whether the pulse magnitude of the at least a subset of the set of igniters satisfies the pulse magnitude threshold.

The method of any preceding clause, wherein at least one igniter of the at least a subset of the set of igniters is designated as an at least one master igniter, wherein the monitoring the series of electrical pulses on the respective transmission line coupled to the at least a subset of the set of igniters includes detecting the series of electrical pulses on the respective transmission line coupled to the at least one master igniter; wherein the determining by the controller the spark rate during the predetermined first period of the at least the subset of the set of igniters includes determining the spark rate of the at least one master igniter, without regard to the spark rate of any remaining igniters; wherein the determining, by the controller, the pulse magnitude of the at least the subset of the set of igniters includes determining the pulse magnitude of the at least one master igniter during the predetermined first period, without regard to the pulse magnitude of any remaining igniters; wherein the determining, by the controller, whether the spark rate of the at least the subset of the set of igniters satisfies the spark rate threshold includes determining whether the spark rate of the at least one master igniter satisfies the spark rate threshold; and wherein the determining, by the controller, whether the pulse magnitude of the at least the subset of the set of igniters satisfies the pulse magnitude threshold includes determining whether the pulse magnitude of the at least one master igniter satisfies the pulse magnitude threshold.

The method of any preceding clause, wherein the predetermined first period is determined based on a desired residence time of the gaseous fuel in the combustor.

The method of any preceding clause, wherein the predetermined first period is determined based on a number of the at least one igniter.

The method of any preceding clause, wherein the gaseous fuel comprises a hydrogen fuel.

The method of any preceding clause, wherein the method is performed at a start-up of the combustion engine.

An ignition system for a combustion engine, comprising: a combustor having at least one igniter, the at least one igniter configured to receive a series of electrical pulses, and, responsive to each electrical pulse, to generate a respective spark; a respective transmission line coupled to the at least one igniter to provide the series of electrical pulses thereto; a respective sensor communicatively coupled to each respective transmission line, configured to detect an electrical pulse thereon and to provide a respective signal indicative of the electrical pulse to a controller, wherein the controller is configured to: determine, prior to an injection of a fuel into the combustor, based on the series of electrical pulses during the predetermined first period, at least one of a spark rate of the at least one igniter, or a pulse magnitude of the series of electrical pulses; determine whether the at least one of the spark rate of the at least one igniter during the predetermined first period satisfies a spark rate threshold, or the pulse magnitude of the series of electrical pulses during the predetermined first period satisfies a pulse magnitude threshold; and, in response to a determination that the at least one of the spark rate of the at least one igniter during the predetermined first period satisfies the spark rate threshold, or the pulse magnitude of the of the series of electrical pulses during the predetermined first period satisfies the pulse magnitude threshold, initiate an injection of the fuel into the combustor.

The ignition system of any preceding clause, wherein, in response to a determination that at least one of the spark rate of the at least one igniter during the predetermined first period does not satisfy the spark rate threshold, or the pulse magnitude of the of the series of electrical pulses during the predetermined first period does not satisfy the pulse magnitude threshold, the controller is configured to prevent the injection of the fuel into the combustor.

The ignition system of any preceding clause, wherein, in response to the determination that the spark rate of the at least one igniter during the predetermined first period does not satisfy the spark rate threshold, or the pulse magnitude of the of the series of electrical pulses during the predetermined first period does not satisfy the pulse magnitude threshold, the controller is further configured to: determine prior to the injection of the fuel into the combustor, based on the series of electrical pulses during the predetermined second period, at least one of the spark rate of the at least one igniter, or the pulse magnitude of the series of electrical pulses; determine, prior to the injection of the fuel into the combustor, whether the at least one of the spark rate of the at least one igniter during the predetermined second period satisfies a spark rate threshold, or the pulse magnitude of the series of electrical pulses during the predetermined second period satisfies a pulse magnitude threshold; and in response to a determination that the at least one of the spark rate of the at least one igniter during the predetermined second period satisfies the spark rate threshold, or the pulse magnitude of the of the series of electrical pulses during the predetermined second period satisfies the pulse magnitude threshold, initiate the injection of the fuel into the combustor.

The ignition system of any preceding clause, wherein the predetermined second period is subsequent to a predetermined delay period.

The ignition system of any preceding clause, wherein the at least one igniter includes a set of igniters, and wherein the controller is further configured to: receive a respective signal indicative of the series of electrical pulses on the respective transmission line coupled to at least a subset of the set of igniters for the predetermined first period; determine at least one of the spark rate of at least the subset of the set of igniters during the predetermined first period based on the respective signal, or the pulse magnitude of the at least a subset of the set of igniters; determine at least one of whether the spark rate of the at least the subset of the set of igniters during the predetermined first period satisfies the spark rate threshold, or whether the pulse magnitude of the at least a subset of the set of igniters satisfies the pulse magnitude threshold; and in response to a determination that at least one of the spark rate of the at least one igniter during the predetermined first period satisfies the spark rate threshold, or the pulse magnitude of the at least a subset of the set of igniters satisfies the pulse magnitude threshold, initiate the injection of the fuel into the combustor.

The ignition system of any preceding clause, wherein at least one igniter of the at least a subset of the set of igniters is designated as an at least one master igniter, and wherein the controller is further configured to: determine at least one of the spark rate of the at least one master igniter without regard to the spark rate of any remaining igniters, or the pulse magnitude of the at least one master igniter, without regard to the pulse magnitude of any remaining igniters; and determine at least one of whether the spark rate of the master igniter satisfies a spark rate threshold, or the pulse magnitude of the at least one master igniter satisfies a pulse magnitude threshold.

The ignition system of any preceding clause, wherein the predetermined first period is determined based on a desired residence time of the fuel in the combustor.

The ignition system of any preceding clause, wherein the predetermined first period is determined based on a number of the at least one igniter.

The ignition system of any preceding clause, wherein the fuel comprises a hydrogen fuel.

The ignition system of any preceding clause, wherein the injection of the fuel into the combustor occurs at a start-up of the combustion engine.

What is claimed is:

1. A method of operating a combustion engine having a combustor including at least one igniter, the method comprising:
   prior to an injection of a gaseous fuel into the combustor, monitoring, for a predetermined first period, a series of electrical pulses on a respective transmission line coupled to the at least one igniter, each electrical pulse respectively indicative of a spark generated by the at least one igniter;
   determining, by a controller, based on the series of electrical pulses during the predetermined first period, at least one of a spark rate of the at least one igniter, or a pulse magnitude of the series of electrical pulses;
   determining, by the controller, whether the at least one of the spark rate of the at least one igniter during the predetermined first period satisfies a spark rate threshold, or the pulse magnitude of the series of electrical pulses during the predetermined first period satisfies a pulse magnitude threshold; and
   in response to a determination that the at least one of the spark rate of the at least one igniter during the predetermined first period satisfies the spark rate threshold, or the pulse magnitude of the of the series of electrical pulses during the predetermined first period satisfies the pulse magnitude threshold, initiating the injection of the gaseous fuel into the combustor;
   wherein the at least one igniter includes a set of igniters, wherein monitoring the series of electrical pulses on a respective transmission line coupled to the at least one igniter includes detecting the series of electrical pulses on a respective transmission line coupled to at least a subset of the set of igniters;
   wherein the determining the spark rate of the at least one igniter includes determining the spark rate of the at least a subset of the set of igniters;
   wherein the determining, the pulse magnitude of the at least one igniter includes determining the pulse magnitude of the at least a subset of the set of igniters;
   wherein the determining, whether the spark rate of the at least one igniter satisfies the spark rate threshold includes determining whether the spark rate of the at least a subset of the set of igniters satisfies the spark rate threshold; and
   wherein the determining, whether the pulse magnitude of the at least one igniter satisfies the pulse magnitude threshold includes determining whether the pulse magnitude of the at least a subset of the set of igniters satisfies the pulse magnitude threshold.

2. The method of claim 1, further comprising, in response to a determination that the spark rate of the at least one igniter during the predetermined first period does not satisfy the spark rate threshold, or the pulse magnitude of the of the series of electrical pulses during the predetermined first period does not satisfy the pulse magnitude threshold, preventing the injection of the gaseous fuel into the combustor.

3. The method of claim 2, further comprising:
   prior to the injection of the gaseous fuel into the combustor, monitoring, for a predetermined second period, the series of electrical pulses on the respective transmission line coupled to the at least one igniter;
   determining, by the controller, based on the series of electrical pulses during the predetermined second period, at least one of the spark rate of the at least one igniter, or the pulse magnitude of the series of electrical pulses;
   determining, by the controller, whether the at least one of the spark rate of the at least one igniter during the predetermined second period satisfies a spark rate threshold, or the pulse magnitude of the series of electrical pulses during the predetermined second period satisfies a pulse magnitude threshold;
   and in response to a determination that the at least one of the spark rate of the at least one igniter during the predetermined second period satisfies the spark rate threshold, or the pulse magnitude of the of the series of electrical pulses during the predetermined second period satisfies the pulse magnitude threshold, initiating the injection of the gaseous fuel into the combustor.

4. The method of claim 3, wherein the predetermined second period occurs subsequent to a predetermined delay period.

5. The method of claim 1, wherein at least one igniter of the at least a subset of the set of igniters is designated as an at least one master igniter, wherein the monitoring the series of electrical pulses on the respective transmission line coupled to the at least a subset of the set of igniters includes detecting the series of electrical pulses on the respective transmission line coupled to the at least one master igniter;
   wherein the determining the spark rate of the at least the subset of the set of igniters includes determining the spark rate of the at least one master igniter, without regard to the spark rate of any remaining igniters;
   wherein the determining the pulse magnitude of the at least the subset of the set of igniters includes determining the pulse magnitude of the at least one master igniter, without regard to the pulse magnitude of any remaining igniters;
   wherein the determining whether the spark rate of the at least the subset of the set of igniters satisfies the spark rate threshold includes determining whether the spark rate of the at least one master igniter satisfies the spark rate threshold; and wherein the determining whether the pulse magnitude of the at least the subset of the set of igniters satisfies the pulse magnitude threshold includes determining whether the pulse magnitude of the at least one master igniter satisfies the pulse magnitude threshold.

6. The method of claim 1, wherein a duration of the predetermined first period is based on a desired residence time of the gaseous fuel in the combustor.

7. The method of claim 1, wherein a duration of the predetermined first period is based on a number of the at least one igniter.

8. The method of claim 1, wherein the gaseous fuel comprises a hydrogen fuel.

9. The method of claim 1, wherein the method is performed at a start-up of the combustion engine.

10. An ignition system for a combustion engine, comprising:
a combustor having at least one igniter, the at least one igniter configured to receive a series of electrical pulses, and, responsive to each electrical pulse, to generate a respective spark;
a respective transmission line coupled to the at least one igniter to provide the series of electrical pulses thereto;
a respective sensor communicatively coupled to each respective transmission line, configured to detect an electrical pulse thereon and to provide a respective signal indicative of the electrical pulse to a controller, wherein the controller is configured to:
determine, prior to an injection of a fuel into the combustor, based on the series of electrical pulses during a predetermined first period, at least one of a spark rate of the at least one igniter, or a pulse magnitude of the series of electrical pulses;
determine whether the at least one of the spark rate of the at least one igniter during the predetermined first period satisfies a spark rate threshold, or the pulse magnitude of the series of electrical pulses during the predetermined first period satisfies a pulse magnitude threshold;
and, in response to a determination that the at least one of the spark rate of the at least one igniter during the predetermined first period satisfies the spark rate threshold, or the pulse magnitude of the of the series of electrical pulses during the predetermined first period satisfies the pulse magnitude threshold, initiate an injection of the fuel into the combustor;
wherein the at least one igniter includes a set of igniters, and wherein the controller is further configured to:
receive a respective signal indicative of the series of electrical pulses on the respective transmission line coupled to at least a subset of the set of igniters for the predetermined first period;
determine based on the respective signal, at least one of the spark rate of at least the subset of the set of igniters during the predetermined first period, or the pulse magnitude of the at least a subset of the set of igniters during the predetermined first period;
determine at least one of whether the spark rate of the at least the subset of the set of igniters during the predetermined first period satisfies the spark rate threshold, or whether the pulse magnitude of the at least the subset of the set of igniters satisfies the pulse magnitude threshold; and in response to a determination that at least one of the spark rate of the at least the subset of the set of igniters during the predetermined first period satisfies the spark rate threshold, or the pulse magnitude of the at least the subset of the set of igniters satisfies the pulse magnitude threshold, initiate the injection of the fuel into the combustor.

11. The ignition system of claim 10, wherein, in response to a determination that at least one of the spark rate of the at least one igniter during the predetermined first period does not satisfy the spark rate threshold, or the pulse magnitude of the of the series of electrical pulses during the predetermined first period does not satisfy the pulse magnitude threshold, the controller is configured to prevent the injection of the fuel into the combustor.

12. The ignition system of claim 11, wherein, in response to the determination that at least one of the spark rate of the at least one igniter during the predetermined first period does not satisfy the spark rate threshold, or the pulse magnitude of the of the series of electrical pulses during the predetermined first period does not satisfy the pulse magnitude threshold, the controller is further configured to:
determine, prior to the injection of the fuel into the combustor, based on the series of electrical pulses during a predetermined second period, at least one of the spark rate of the at least one igniter, or the pulse magnitude of the series of electrical pulses;
determine, prior to the injection of the fuel into the combustor, whether the at least one of the spark rate of the at least one igniter during the predetermined second period satisfies a spark rate threshold, or the pulse magnitude of the series of electrical pulses during the predetermined second period satisfies the pulse magnitude threshold;
and in response to a determination that the at least one of the spark rate of the at least one igniter during the predetermined second period satisfies the spark rate threshold, or the pulse magnitude of the of the series of electrical pulses during the predetermined second period satisfies the pulse magnitude threshold,
initiate the injection of the fuel into the combustor.

13. The ignition system of claim 12, wherein the predetermined second period is subsequent to a predetermined delay period.

14. The ignition system of claim 10, wherein at least one igniter of the at least a subset of the set of igniters is designated as an at least one master igniter, and wherein the controller is further configured to:
determine at least one of the spark rate of the at least one master igniter during the predetermined first period without regard to the spark rate of any remaining igniters, or the pulse magnitude of the at least one master igniter during the predetermined first period without regard to the pulse magnitude of any remaining igniters; and
determine whether at least one of the spark rate of the master igniter satisfies a spark rate threshold, or the pulse magnitude of the at least one master igniter satisfies a pulse magnitude threshold; and in response to a determination that at least one of the spark rate of the at least one master igniter during the predetermined first period satisfies the spark rate threshold, or the pulse magnitude of the at least one master igniter satisfies the pulse magnitude threshold,
initiate the injection of the fuel into the combustor.

15. The ignition system of claim 10, wherein a duration of the predetermined first period is based on a desired residence time of the fuel in the combustor.

16. The ignition system of claim 10, wherein a duration of the predetermined first period is determined based on a number of the at least one igniter.

17. The ignition system of claim 10, wherein the fuel comprises a hydrogen fuel.

18. The ignition system of claim 17, wherein the injection of the fuel into the combustor occurs at a start-up of the combustion engine.

* * * * *